(12) United States Patent
Abe et al.

(10) Patent No.: US 10,494,487 B2
(45) Date of Patent: Dec. 3, 2019

(54) POLYCARBONATE RESIN COMPOSITION AND MOLDED ARTICLE THEREOF

(71) Applicant: IDEMITSU KOSAN CO., LTD., Tokyo (JP)

(72) Inventors: Tomoko Abe, Ichihara (JP); Yasuhiro Ishikawa, Ichihara (JP); Makoto Ando, Chiba (JP); Hiroshi Yamaguchi, Ichihara (JP)

(73) Assignee: IDEMITSU KOSAN CO., LTD., Tokyo (JP)

( * ) Notice: Subject to any disclaimer, the term of this patent is extended or adjusted under 35 U.S.C. 154(b) by 89 days.

(21) Appl. No.: 15/754,156

(22) PCT Filed: Aug. 29, 2016

(86) PCT No.: PCT/JP2016/075201
§ 371 (c)(1),
(2) Date: Feb. 21, 2018

(87) PCT Pub. No.: WO2017/034039
PCT Pub. Date: Mar. 2, 2017

(65) Prior Publication Data
US 2018/0251606 A1 Sep. 6, 2018

(30) Foreign Application Priority Data
Aug. 27, 2015 (JP) .................... 2015-167755

(51) Int. Cl.
*C08L 69/00* (2006.01)
*C08G 81/02* (2006.01)
(Continued)

(52) U.S. Cl.
CPC .......... *C08G 81/027* (2013.01); *C08G 81/00* (2013.01); *C08L 69/00* (2013.01); *C08L 83/10* (2013.01);
(Continued)

(58) Field of Classification Search
CPC .................. C08L 69/00; C08L 83/10
See application file for complete search history.

(56) References Cited

U.S. PATENT DOCUMENTS

2005/0187372 A1  8/2005  Venderbosch et al.
2006/0047037 A1  3/2006  Kawato et al.
(Continued)

FOREIGN PATENT DOCUMENTS

CN  1678685 A  10/2005
CN  1751096 A  3/2006
(Continued)

OTHER PUBLICATIONS

Extended European Search Report dated Mar. 22, 2019 in corresponding application No. 16839386.
(Continued)

*Primary Examiner* — Mark S Kaucher
(74) *Attorney, Agent, or Firm* — Foley & Lardner LLP

(57) ABSTRACT

Provided is a polycarbonate-based resin composition containing: a polycarbonate-polyorganosiloxane copolymer (A) containing a specific polycarbonate block (A-1) and a specific polyorganosiloxane block (A-2); and an aromatic polycarbonate-based resin (B) except the copolymer (A), the polycarbonate-based resin composition having a structure in which a domain (d-1) containing the polyorganosiloxane block (A-2) is present in a matrix containing the resin (B) as a main component, and a domain (d-2) containing at least one selected from a block derived from the aromatic polycarbonate-based resin (B) and the polycarbonate block (A-1) is present inside the domain (d-1).

21 Claims, 11 Drawing Sheets

Domain (d) in which (d-2) is present inside (d-1)
Domain (d') formed only of (d-1)

(51) Int. Cl.
*C08L 83/10* (2006.01)
*C08G 81/00* (2006.01)
*C08G 77/448* (2006.01)

(52) U.S. Cl.
CPC ...... *C08G 77/448* (2013.01); *C08L 2203/206* (2013.01)

(56) References Cited

U.S. PATENT DOCUMENTS

| | | | |
|---|---|---|---|
| 2006/0074156 | A1 | 4/2006 | Ebeling et al. |
| 2008/0103267 | A1* | 5/2008 | Hurst ............... C08L 69/00 525/464 |
| 2012/0271009 | A1 | 10/2012 | Higaki et al. |
| 2014/0234629 | A1 | 8/2014 | Sun et al. |

FOREIGN PATENT DOCUMENTS

| | | | |
|---|---|---|---|
| CN | 1869824 | A | 11/2006 |
| CN | 101056942 | A | 10/2007 |
| CN | 101553525 | A | 10/2009 |
| CN | 102471474 | A | 5/2012 |
| CN | 103917598 | A | 7/2014 |
| CN | 104334641 | A | 2/2015 |
| EP | 3 342 824 | A1 | 7/2018 |
| JP | 2662310 | B2 | 10/1997 |
| JP | 2006-523243 | A | 10/2006 |
| JP | 2006-330251 | A | 12/2006 |
| JP | 2008-516013 | A | 5/2008 |
| JP | 2011-021127 | A | 2/2011 |
| JP | 2011-236287 | A | 11/2011 |
| JP | 2012-153824 | A | 8/2012 |
| JP | 2012-246390 | A | 12/2012 |
| WO | WO-2013/183521 | A1 | 12/2013 |
| WO | WO-2015/113916 | A1 | 8/2015 |

OTHER PUBLICATIONS

Pixton et al, Structure Property Relationships in Polycarbonate/Polydimethylsiloxane Copolymers, Congresso Brasileiro de Polimeros, 2005, pp. 1330-1331.

Matthew R. Pixton, et al., "Structure to Property Relationships in Polycarbonate/Polydimethylsiloxane Copolymers", Antec (2006), pp. 2655-2659.

International Search Report issued in International Patent Application No. PCT/JP2016/075201 dated Oct. 18, 2016.

Third Party Observations issued in the corresponding European Patent Application Ser. No. 16839386.6, dated Jun. 28, 2019.

China National Intellectual Property Administration, "First Office Action," issued in connection with Chinese Patent Application No. 201680049799.0, dated Sep. 30, 2019.

Chen et al, "Mechanical Property and Flame Retardancy of PC/Polysiloxane Composite," China Academic Journal Electronic Publishing House, Dec. 31, 2010, pp. 92-96.

* cited by examiner

Domain (d) in which (d-2) is present inside (d-1)

Domain (d') formed only of (d-1)

Domain (d) in which two or more(d-2) are present inside (d-1)

Domain (d) in which two or more (d-2) are present inside (d-1)

Domain (d) in which (d-2) is present inside (d-1)

Domain (d') formed only of (d-1)

Domain (d) in which two or more (d-2) are present inside (d-1)

Al domains in observation field of view
are each domain (d') formed only of (d-1)

Distance between two tangency points of tangency line of domain, where the tangency line has tangency points corresponding to two end points α and β of opening portion.

Long-axis distance of domain

FIG. 11

Distance between two tangency points of tangency line of domain, where the tangency line has tangency points corresponding to two end points α and β of opening portion.

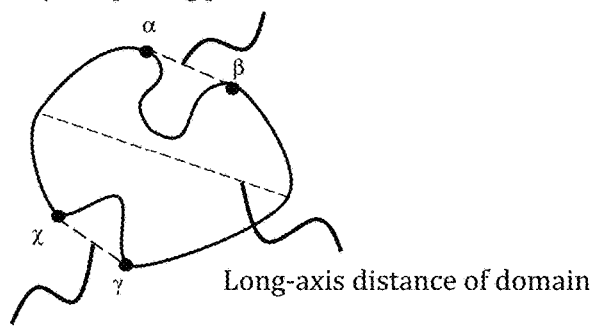

Long-axis distance of domain

Distance between two tangency points of tangency line of domain, where the tangency line has tangency points corresponding to two end points χ and γ of opening portion.

FIG. 12

Distance between two tangency points of tangency line of domain, where the tangency line has tangency points corresponding to two end points α and β of opening portion.

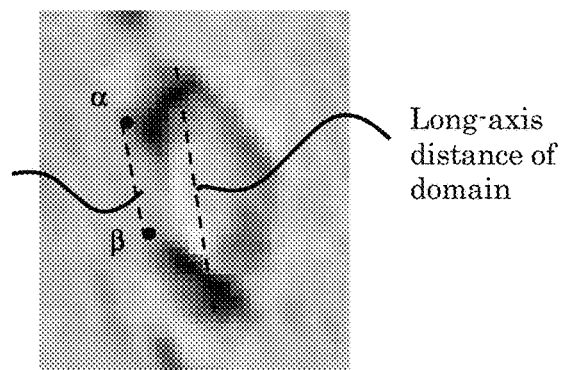

Long-axis distance of domain

POLYCARBONATE RESIN COMPOSITION AND MOLDED ARTICLE THEREOF

RELATED APPLICATIONS

The present application claims priority under 35 USC 371 to International Patent Application number PCT/JP2016/075201, filed Aug. 29, 2016, which claims priority to Japanese Patent Application No. 2015-167755, filed Aug. 27, 2015. The contents of these applications are hereby incorporated by reference in their entireties.

TECHNICAL FIELD

The present invention relates to a polycarbonate-based resin composition containing a polycarbonate-polyorganosiloxane copolymer and a molded article thereof.

BACKGROUND ART

A polycarbonate-polyorganosiloxane copolymer (hereinafter sometimes abbreviated as "PC-POS copolymer") has been attracting attention because of its excellent properties, such as high impact resistance, chemical resistance, and flame retardancy. Accordingly, the polycarbonate-polyorganosiloxane copolymer has been expected to be widely utilized in various fields, such as the field of electrical and electronic equipment and the field of automobiles. In particular, the utilization of the polycarbonate-polyorganosiloxane copolymer in casings for a cellular phone, a mobile personal computer, a digital camera, a video camera, an electric tool, and the like, and in other commodities has been expanding.

In normal cases, a homopolycarbonate using 2,2-bis(4-hydroxyphenyl)propane [common name: bisphenol A] as a dihydric phenol serving as a raw material has been generally used as a typical polycarbonate. A polycarbonate-polyorganosiloxane copolymer using a polyorganosiloxane as a copolymerizable monomer has been known for improving the physical properties of the homopolycarbonate, such as flame retardancy and impact resistance (Patent Document 1).

Examples of an approach to further improving the impact resistance of a polycarbonate resin containing the polycarbonate-polyorganosiloxane copolymer may include an approach involving using a polyorganosiloxane having a long chain length, and an approach involving increasing the amount of the polyorganosiloxane in the polycarbonate-polyorganosiloxane copolymer as described in Patent Documents 2 and 3.

CITATION LIST

Patent Literature

Patent Document 1: JP 2662310 B2
Patent Document 2: JP 2011-21127 A
Patent Document 3: JP 2012-246390 A

SUMMARY OF INVENTION

Technical Problem

An object of the present invention is to provide a polycarbonate-based resin composition containing a polycarbonate-polyorganosiloxane copolymer having impact resistance more excellent than that of a known polycarbonate-based resin.

Solution to Problem

The inventors of the present invention have found that when a polycarbonate-based resin composition containing a polycarbonate-polyorganosiloxane copolymer having a specific structure is used, impact resistance more excellent than that of a polycarbonate-based resin composition having a comparable polyorganosiloxane chain length or containing a comparable polyorganosiloxane block amount is obtained.

That is, the present invention relates to the following items [1] to [21].

[1] A polycarbonate-based resin composition, comprising: a polycarbonate-polyorganosiloxane copolymer (A) containing a polycarbonate block (A-1) comprising a repeating unit represented by the following general formula (I) and a polyorganosiloxane block (A-2) comprising a repeating unit represented by the following general formula (II); and an aromatic polycarbonate-based resin (B) except the polycarbonate-polyorganosiloxane copolymer (A), wherein the polycarbonate-based resin composition has a structure in which a domain (d-1) containing the polyorganosiloxane block (A-2) is present in a matrix containing the aromatic polycarbonate-based resin (B) as a main component, and a domain (d-2) containing at least one selected from a block derived from the aromatic polycarbonate-based resin (B) and the polycarbonate block (A-1) is present inside the domain (d-1):

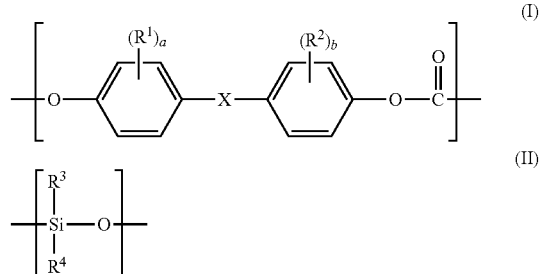

wherein $R^1$ and $R^2$ each independently represent a halogen atom, an alkyl group having 1 to 6 carbon atoms, or an alkoxy group having 1 to 6 carbon atoms, X represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, a fluorenediyl group, an arylalkylene group having 7 to 15 carbon atoms, an arylalkylidene group having 7 to 15 carbon atoms, —S—, —SO—, —SO$_2$—, —O—, or —CO—, $R^3$ and $R^4$ each independently represent a hydrogen atom, a halogen atom, an alkyl group having 1 to 6 carbon atoms, an alkoxy group having 1 to 6 carbon atoms, or an aryl group having 6 to 12 carbon atoms, and a and b each independently represent an integer of from 0 to 4.

[2] The polycarbonate-based resin composition according to Item [1], wherein a mass ratio "(A)/(B)" of the polycarbonate-polyorganosiloxane copolymer (A) to the aromatic polycarbonate-based resin (B) is from 0.1/99.9 to 99.9/0.1.

[3] The polycarbonate-based resin composition according to Item [1] or [2], wherein the aromatic polycarbonate-based resin (B) contains a polycarbonate block comprising, in a main chain thereof, a repeating unit represented by the following general formula (III):

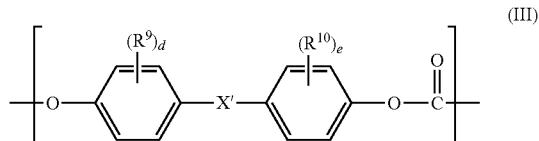

wherein $R^9$ and $R^{10}$ each independently represent a halogen atom, an alkyl group having 1 to 6 carbon atoms, or an alkoxy group having 1 to 6 carbon atoms, X' represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, —S—, —SO—, —SO$_2$—, —O—, or —CO—, and d and e each independently represent an integer of from 0 to 4.

[4] The polycarbonate-based resin composition according to any one of Items [1] to [3], wherein the domain (d-1) is mainly formed of the polyorganosiloxane block (A-2).

[5] The polycarbonate-based resin composition according to any one of Items [1] to [4], wherein the domain (d-2) is mainly formed of at least one selected from the block derived from the aromatic polycarbonate-based resin (B) and the polycarbonate block (A-1).

[6] The polycarbonate-based resin composition according to any one of Items [1] to [5], wherein only the one domain (d-2) is present inside the domain (d-1).

[7] The polycarbonate-based resin composition according to any one of Items [1] to [5], wherein the two or more domains (d-2) are present inside the domain (d-1).

[8] The polycarbonate-based resin composition according to any one of Items [1] to [7], wherein a ratio of a number of domains (d) in each of which the domain (d-2) is present inside the domain (d-1) to a total number of the domains (d) and domains (d') each formed only of the domain (d-1) is from 2% to 100%.

[9] The polycarbonate-based resin composition according to Item [8], wherein an average cross-section area of all domains corresponding to a total of the domains (d) and the domains (d') is 200 nm$^2$ or more.

[10] The polycarbonate-based resin composition according to claim [8] or [9], wherein an average cross-section area of all domains corresponding to a total of the domains (d) and the domains (d') is 20,000 nm$^2$ or less.

[11] The polycarbonate-based resin composition according to any one of Items [8] to [10], wherein a mean inter-particle distance of all domains corresponding to a total of the domains (d) and the domains (d') is 500 nm or less.

[12] The polycarbonate-based resin composition according to any one of Items [8] to [11], wherein a mean inter-particle distance of all domains corresponding to a total of the domains (d) and the domains (d') is 50 nm or more.

[13] The polycarbonate-based resin composition according to any one of Items [1] to [12], wherein the polyorganosiloxane block (A-2) has an average chain length of from 30 to 500.

[14] The polycarbonate-based resin composition according to any one of Items [1] to [13], wherein the polyorganosiloxane block (A-2) has an average chain length of from 55 to 500.

[15] The polycarbonate-based resin composition according to any one of Items [1] to [14], wherein a content of the polyorganosiloxane block (A-2) in the polycarbonate-polyorganosiloxane copolymer (A) is from 5 mass % to 70 mass %.

[16] The polycarbonate-based resin composition according to any one of Items [1] to [15], wherein a content of the polyorganosiloxane block (A-2) in the polycarbonate-based resin composition is from 0.1 mass % to 10 mass %.

[17] The polycarbonate-based resin composition according to any one of Items [1] to [16], wherein the polycarbonate-polyorganosiloxane copolymer (A) has a viscosity-average molecular weight (Mv) of from 9,000 to 50,000.

[18] The polycarbonate-based resin composition according to anyone of Items [1] to [17], wherein the polycarbonate-based resin composition has a viscosity-average molecular weight (Mv) of from 9,000 to 50,000.

[19] A molded article, which is obtained by molding the polycarbonate-based resin composition of any one of Items [1] to [18].

[20] The molded article according to Item [19], wherein the molded article comprises a casing for electrical and electronic equipment.

[21] The molded article according to Item [19], wherein the molded article comprises a part for an automobile and a building material.

Advantageous Effects of Invention

According to the present invention, the polycarbonate-based resin composition containing the polycarbonate-polyorganosiloxane copolymer has a specific structure, and hence a polycarbonate-based resin composition excellent in impact resistance, in particular, low-temperature impact resistance, and a molded article thereof can be obtained.

BRIEF DESCRIPTION OF DRAWINGS

FIG. 11 is a view for illustrating the long-axis distance of a domain having two opening portions, and each distance between two tangency points of tangency lines of domain which has two opening portions, where each tangency line has tangency points corresponding to two end points of opening portion.

FIG. 12 is a scanning probe microscope image for showing the long-axis distance of a domain having one opening portion, and a distance between two tangency points of tangency line of domain which has one opening portion, where the tangency line has tangency points corresponding to two end points of opening portion.

DESCRIPTION OF EMBODIMENTS

Figure 1:
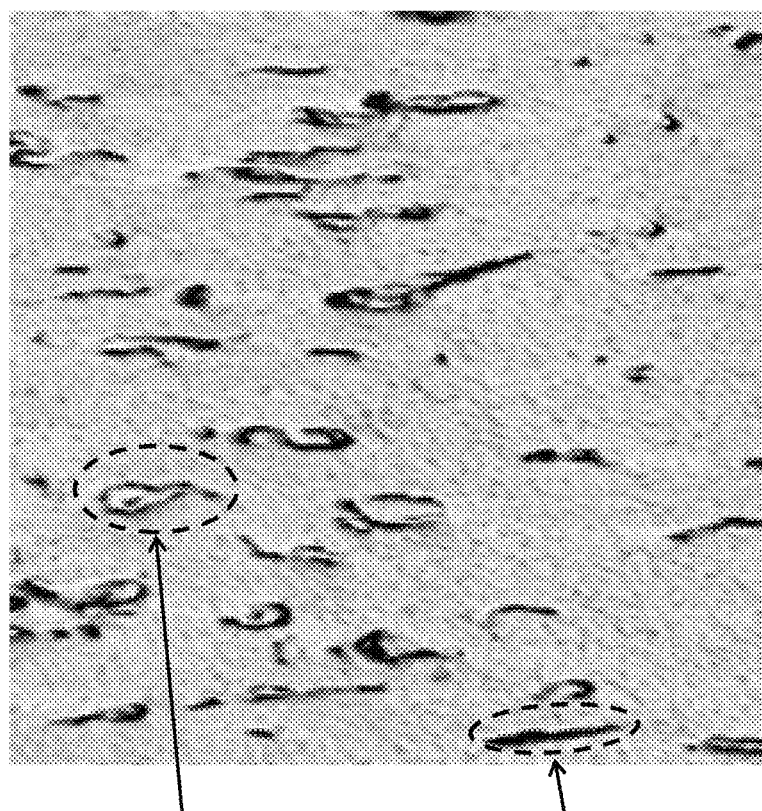
FIG. 1 is a typical image of the result of the observation of a polycarbonate-based resin composition obtained in Example 1 with a scanning probe microscope (the image corresponds to a 1-micrometer square).
Figure 2:
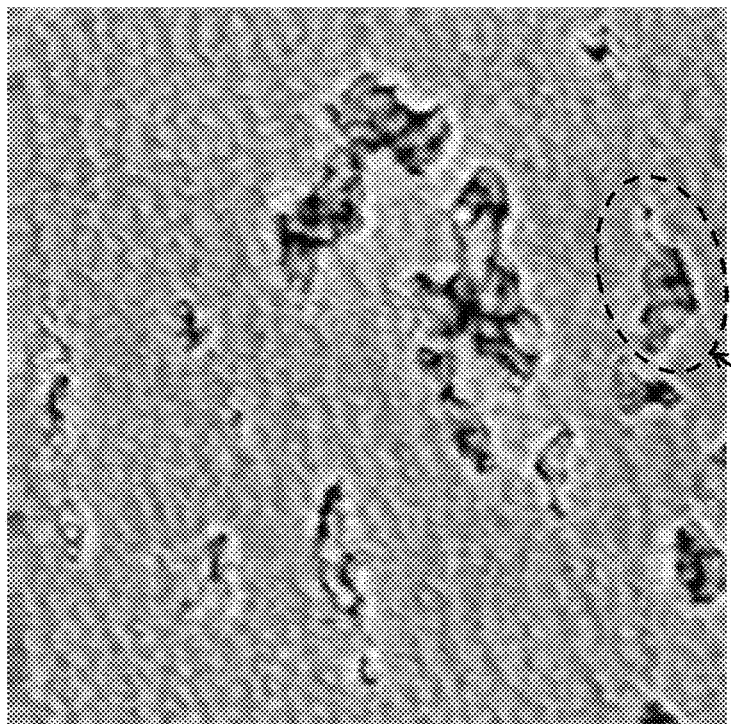
FIG. 2 is a typical image of the result of the observation of a polycarbonate-based resin composition obtained in Example 2 with a scanning probe microscope (the image corresponds to a 1-micrometer square).
Figure 3:
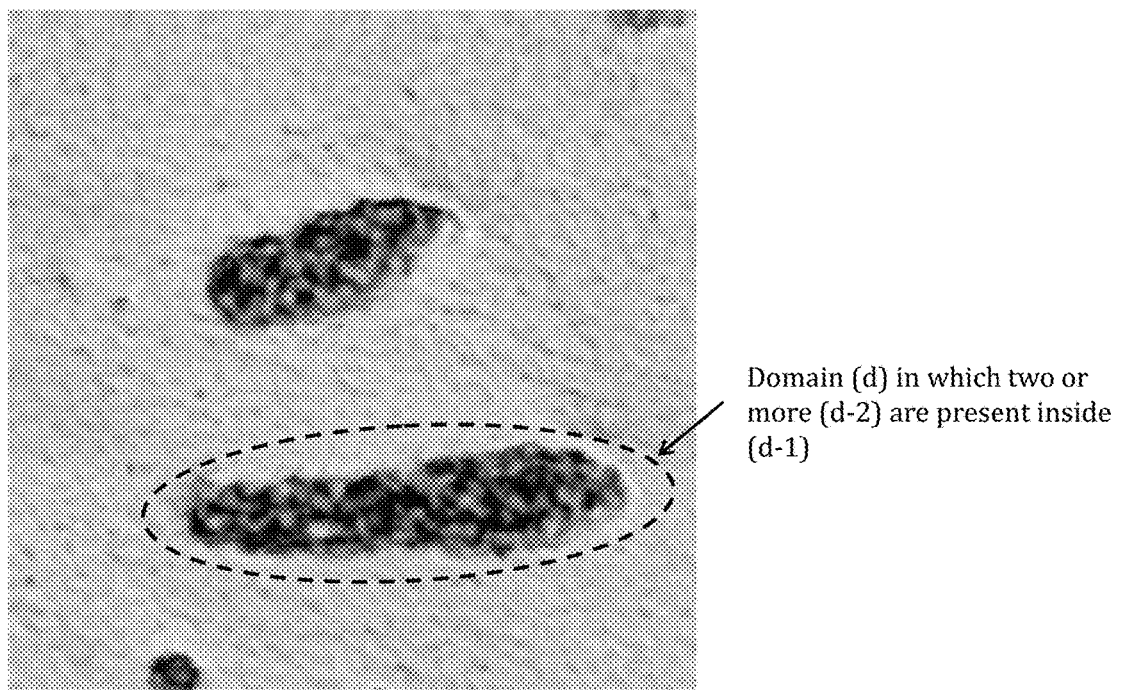
FIG. 3 is a typical image of the result of the observation of a polycarbonate-based resin composition obtained in Example 3 with a scanning probe microscope (the image corresponds to a 1-micrometer square).
Figure 4:
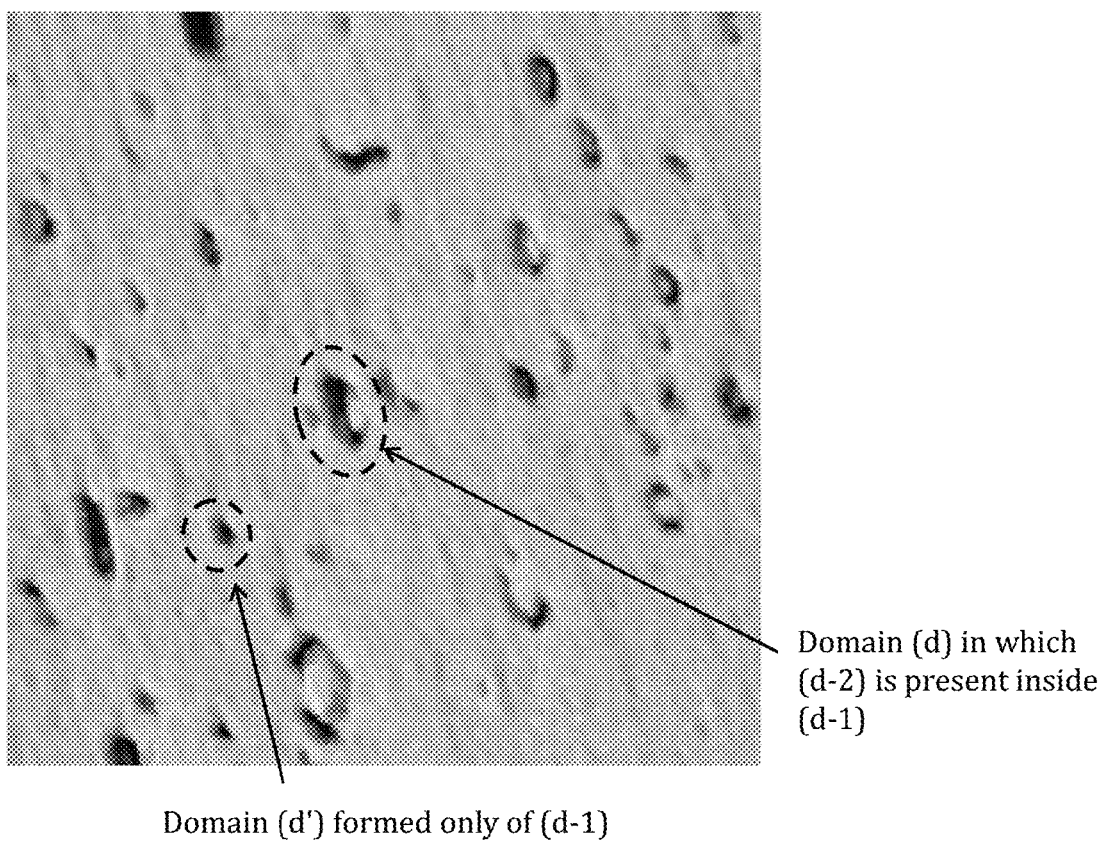
FIG. 4 is a typical image of the result of the observation of a polycarbonate-based resin composition obtained in Example 4 with a scanning probe microscope (the image corresponds to a 1-micrometer square).
Figure 5:
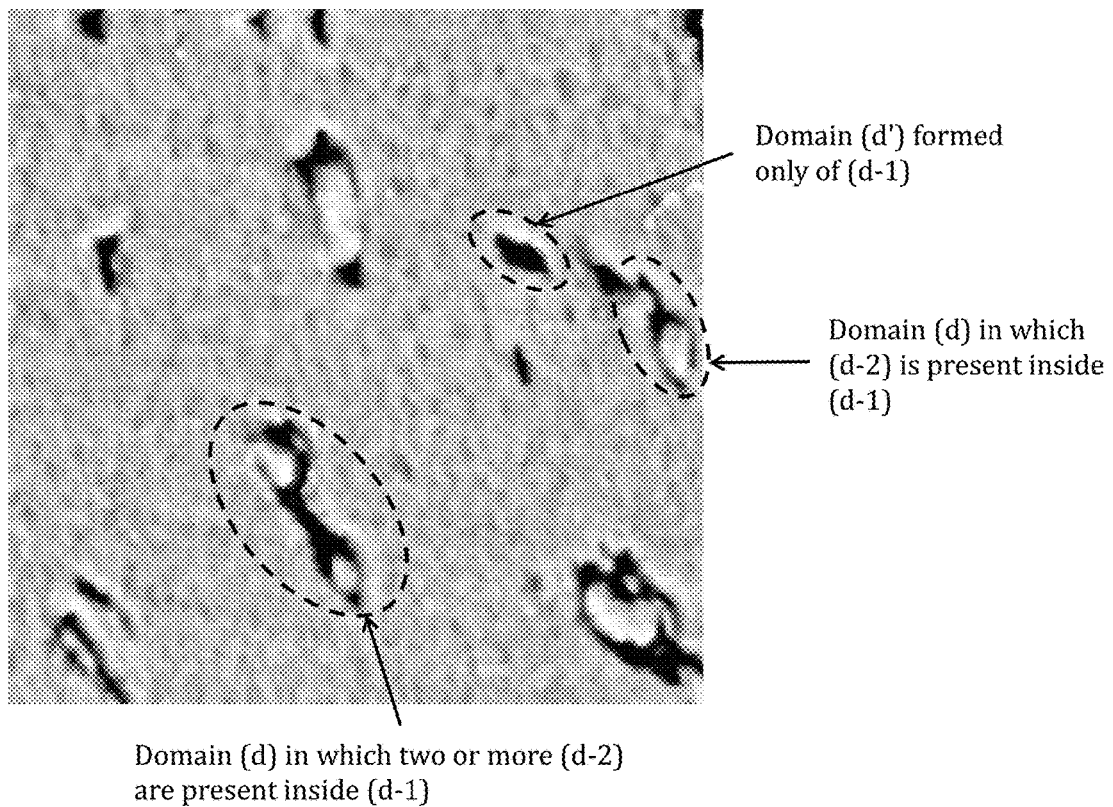
FIG. 5 is a typical image of the result of the observation of a polycarbonate-based resin composition obtained in Example 5 with a scanning probe microscope (the image corresponds to a 1-micrometer square).
Figure 6:
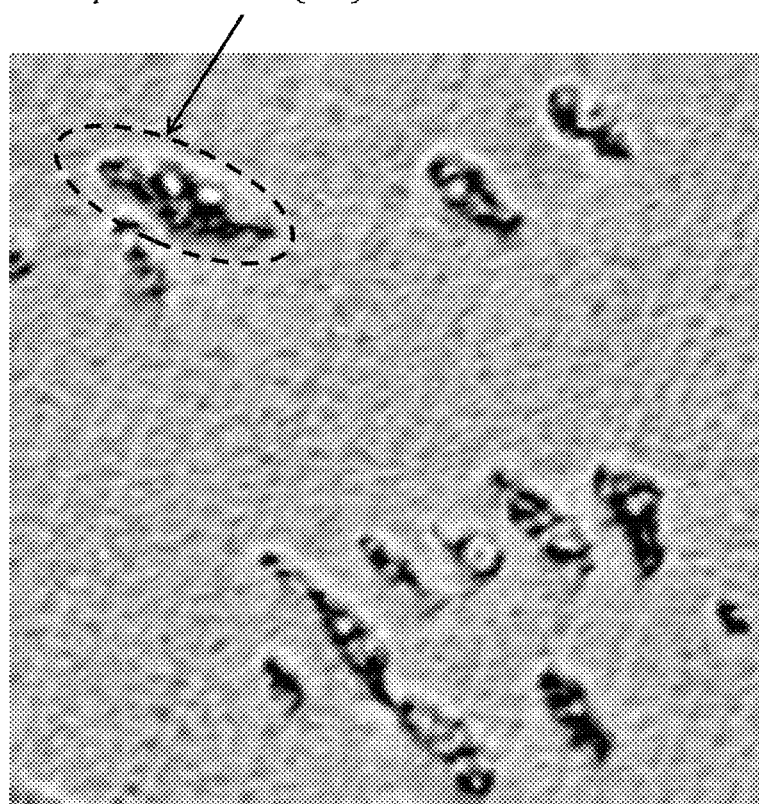
FIG. 6 is a typical image of the result of the observation of a polycarbonate-based resin composition obtained in Example 6 with a scanning probe microscope (the image corresponds to a 1-micrometer square).
Figure 7:
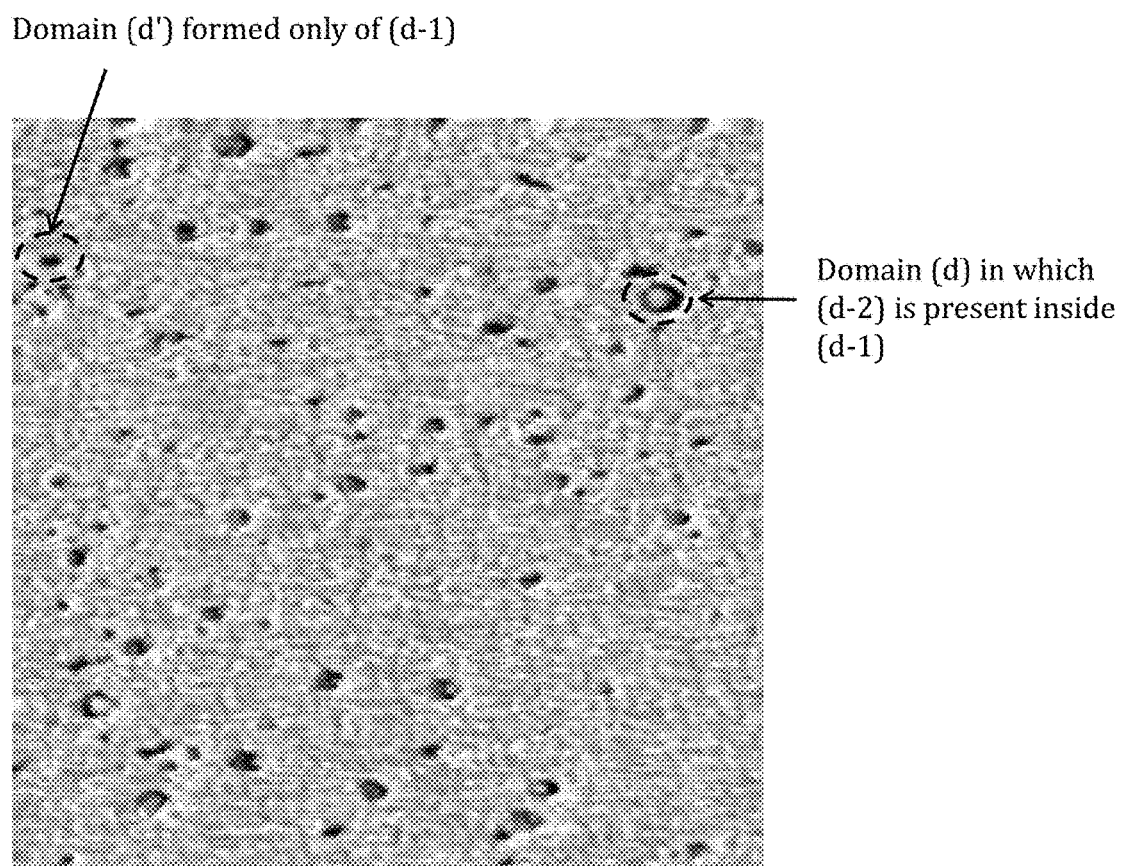
FIG. 7 is a typical image of the result of the observation of a polycarbonate-based resin composition obtained in Example 7 with a scanning probe microscope (the image corresponds to a 1-micrometer square).
Figure 8:
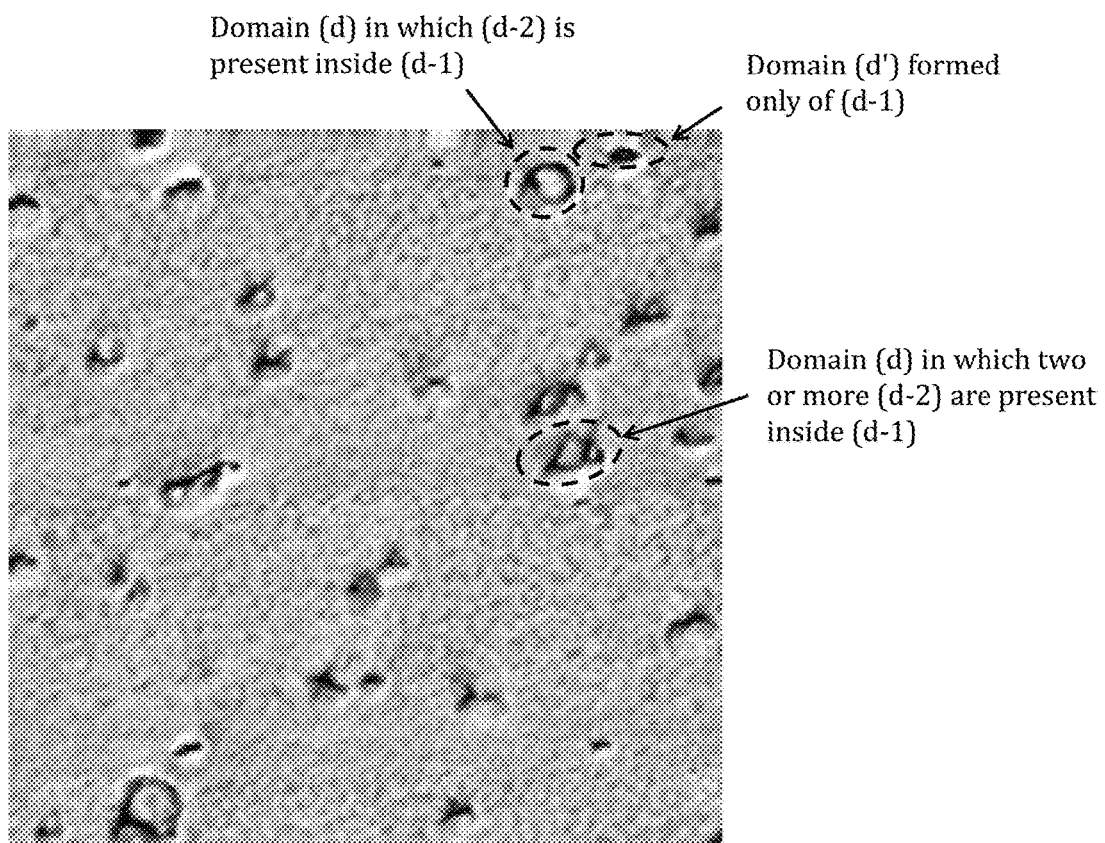
FIG. 8 is a typical image of the result of the observation of a polycarbonate-based resin composition obtained in Example 8 with a scanning probe microscope (the image corresponds to a 1-micrometer square).
Figure 9:
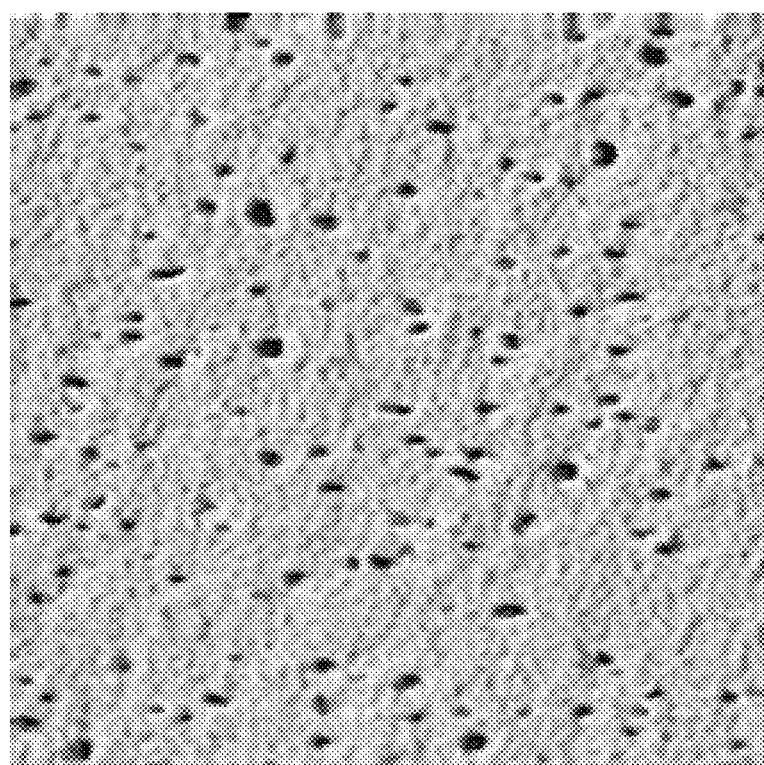
FIG. 9 is a typical image of the result of the observation of a polycarbonate-based resin composition obtained in Comparative Example 4 with a scanning probe microscope (the image corresponds to a 1-micrometer square).

The inventors of the present invention have made extensive investigations, and as a result, have found that when a polycarbonate-based resin composition containing a polycarbonate-polyorganosiloxane copolymer having a specific structure is used, low-temperature impact resistance more excellent than that of a polycarbonate-based resin composition having a comparable polyorganosiloxane chain length or containing a comparable polyorganosiloxane block amount is obtained. Detailed description is given below.

<Polycarbonate-Based Resin Composition>

A polycarbonate-based resin composition of the present invention contains a polycarbonate-polyorganosiloxane copolymer (A) containing a polycarbonate block (A-1) comprising a repeating unit represented by the following general formula (I) and a polyorganosiloxane block (A-2) comprising a repeating unit represented by the following general formula (II), and an aromatic polycarbonate-based resin (B) except the polycarbonate-polyorganosiloxane copolymer (A), and has a structure in which a domain (d-1) containing the polyorganosiloxane block (A-2) is present in a matrix containing the aromatic polycarbonate-based resin (B) as a main component, and a domain (d-2) containing at least one selected from a block derived from the aromatic polycarbonate-based resin (B) and the polycarbonate block (A-1) is present inside the domain (d-1):

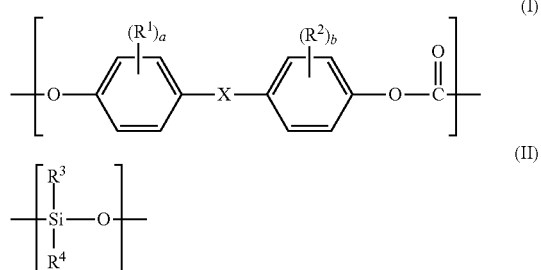

In the general formula (I), $R^1$ and $R^2$ each independently represent a halogen atom, an alkyl group having 1 to 6 carbon atoms, or an alkoxy group having 1 to 6 carbon atoms, X represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, a fluorenediyl group, an arylalkylene group having 7 to 15 carbon atoms, an arylalkylidene group having 7 to 15 carbon atoms, —S—, —SO—, —SO$_2$—, —O— or —CO—, and a and b each independently represent an integer of from 0 to 4; and in the general formula (II), $R^3$ and $R^4$ each independently represent a hydrogen atom, a halogen atom, an alkyl group having 1 to 6 carbon atoms, an alkoxy group having 1 to 6 carbon atoms, or an aryl group having 6 to 12 carbon atoms.

Specific examples of each of $R^1$ to $R^4$, X, a, and b in the formulae are described later.

The content of the polycarbonate-polyorganosiloxane copolymer (A) in the polycarbonate-based resin composition of the present invention is typically from 0.1 mass % to 99.9 mass %, preferably from 1 mass % to 99 mass %, more preferably from 2 mass % to 50 mass %, still more preferably from 5 mass % to 20 mass % from the viewpoints of the ease with which the resin composition is produced and the impact resistance of the resin composition to be obtained.

The content of the aromatic polycarbonate-based resin (B) in the polycarbonate-based resin composition of the present invention is typically from 99.9 mass % to 0.1 mass %, preferably from 99 mass % to 1 mass %, more preferably from 98 mass % to 50 mass %, still more preferably from 95 mass % to 80 mass % from the viewpoints of the ease with which the resin composition is produced and the impact resistance of the resin composition to be obtained.

In the present invention, a mass ratio "(A)/(B)" of the polycarbonate-polyorganosiloxane copolymer (A) to the aromatic polycarbonate-based resin (B) is typically from 0.1/99.9 to 99.9/0.1, preferably from 1/99 to 99/1, more preferably from 2/98 to 50/50, still more preferably from 5/95 to 20/80.

In the polycarbonate-based resin composition of the present invention, the domain (d-1) containing the polyorganosiloxane block (A-2) is present in at least the matrix containing the aromatic polycarbonate-based resin (B) as a main component, and the domain (d-2) containing at least one selected from the block derived from the aromatic polycarbonate-based resin (B) and the polycarbonate block (A-1) is further present inside the domain (d-1). Only the one domain (d-2) may be present inside the one domain (d-1), or the two or more domains (d-2) may be present inside the one domain (d-1). Thus, the polycarbonate-based resin composition of the present invention necessarily has a domain (d) in which the at least one domain (d-2) is present inside the domain (d-1).

The matrix in the polycarbonate-based resin composition is mainly formed of at least one selected from the block derived from the aromatic polycarbonate-based resin (B) and the polycarbonate block (A-1) as long as the ratio of the polyorganosiloxane block (A-2) to the total of the polycarbonate-polyorganosiloxane copolymer (A) and the aromatic polycarbonate-based resin (B) is not more than 50 mass %. The domain (d-1) containing the polyorganosiloxane block (A-2) is preferably mainly formed of the polyorganosiloxane block (A-2). The domain (d-2) containing at least one selected from the block derived from the aromatic polycarbonate-based resin (B) and the polycarbonate block (A-1) is preferably mainly formed of at least one selected from the block derived from the aromatic polycarbonate-based resin (B) and the polycarbonate block (A-1), and may be mainly formed of the block derived from the aromatic polycarbonate-based resin (B) or the polycarbonate block (A-1), or may be mainly formed of both the block derived from the aromatic polycarbonate-based resin (B) and the polycarbonate block (A-1).

Which block a detected domain is mainly formed of is judged from the contrast of an image obtained by observation with a scanning probe microscope (SPM). As shown in FIG. 1, a domain showing contrast comparable to that of the matrix among the detected domains is judged to be mainly formed of at least one selected from the block derived from the aromatic polycarbonate-based resin (B) and the polycarbonate block (A-1). Similarly, a domain showing so dark contrast as to be clearly distinguished from the matrix among the detected domains is judged to be mainly formed of the polyorganosiloxane block (A-2).

In one embodiment of the present invention, the domain (d-1) containing the polyorganosiloxane block (A-2) is substantially formed of the polyorganosiloxane block (A-2). The domain (d-2) containing at least one selected from the block derived from the aromatic polycarbonate-based resin (B) and the polycarbonate block (A-1) is substantially formed of at least one selected from the block derived from the aromatic polycarbonate-based resin (B) and the polycarbonate block (A-1), and may be substantially formed of the block derived from the aromatic polycarbonate-based resin (B) or the polycarbonate block (A-1), or may be substantially formed of both the block derived from the aromatic polycarbonate-based resin (B) and the polycarbonate block (A-1).

An example of the structure of the polycarbonate-based resin composition of the present invention is described in more detail. The polycarbonate-based resin composition of the present invention has a core-shell structure having the domain (d-1) forming a shell in the matrix and the one domain (d-2) forming a core therein. In addition, the composition may have a structure in which the two or more domains (d-2) each having a spherical shape or a cylindrical shape are incorporated inside the one domain (d-1), or a microphase-separated structure, such as a gyroid structure, a lamellar structure, or a salami structure.

When a domain different from the domain (d), the domain being formed only of the domain (d-1) containing the polyorganosiloxane block (A-2) (i.e., the (d-2) is not incorporated inside the (d-1)), is represented by (d'), the ratio of the number of the domains (d) each having the domain (d-2) inside the domain (d-1) to the total number of the domains (d) and the domains (d') each formed only of the domain (d-1) in the polycarbonate-based resin composition is preferably from 2% to 100%. When the ratio of the number of the domains (d) falls within the range, more excellent impact resistance can be obtained. The ratio of the number of the domains (d) is more preferably from 2% to 50%, still more preferably from 5% to 45%, particularly preferably from 15% to 30%. The numbers of the respective domains (d) and (d') were visually measured with a SPM.

The average cross-section area of all domains corresponding to the total of the domains (d) and the domains (d') is preferably 200 nm$^2$ or more. When the average cross-section area of all the domains is 200 nm$^2$ or more, more excellent impact resistance can be obtained. In addition, the average cross-section area of all the domains corresponding to the total of the domains (d) and the domains (d') is preferably 20,000 nm$^2$ or less. When the average cross-section area of all the domains is 20,000 nm$^2$ or less, more excellent impact resistance can be obtained. The average cross-section area of all the domains corresponding to the total of the domains (d) and the domains (d') is more preferably from 300 nm$^2$ to 5,000 nm$^2$, still more preferably from 500 nm$^2$ to 4,000 nm$^2$, particularly preferably from 1,000 nm$^2$ to 4,000 nm$^2$.

Figure 10:
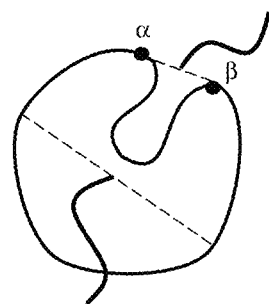
FIG. 10 is a view for illustrating the long-axis distance of a domain having one opening portion, and a distance between two tangency points of tangency line of domain which has one opening portion, where the tangency line has tangency points corresponding to two end points of opening portion.

The average cross-section area of the respective domains (d) and (d') was calculated by observing the domains with a SPM and processing the resultant image with image analysis software (SPIP). Here, an average cross-section area in the case where the domains (d) and (d') each had an opening portion at the time of the observation with the SPM was calculated as described below. In the case where one domain had one opening portion as illustrated in FIG. 10, when a distance between two tangency points of tangency line of domain where the tangency line has tangency points corresponding to two end points of opening portion, was ½ or less of the long-axis distance of the domain, the average cross-section area was calculated as the average cross-section area of the respective domains (d) and domains (d') while the cross-section area of the one domain was regarded as the cross-section area of a domain free of the opening portion. In the case where one domain had two or more opening portions (two opening portions in FIG. 11) as illustrated in FIG. 11, when each distance between two tangency points of tangency line of domain, where each tangency line has tangency points corresponding to two end points of opening portion, was ½ or less of the long-axis distance of the domain, the cross-section area of the one domain was regarded as the cross-section area of a domain free of the respective opening portions. A scanning probe microscope image of a domain having one opening portion is shown in FIG. 12.

The mean inter-particle distance of all the domains corresponding to the total of the domains (d) and the domains (d') in the polycarbonate-based resin composition of the present invention is preferably 500 nm or less. The mean inter-particle distance of all the domains represents the frequency of presence of all the domains in the matrix. When the mean inter-particle distance of all the domains is 500 nm or less, more excellent impact resistance can be obtained. When the mean inter-particle distance of all the domains is 50 nm or more, more excellent impact resistance can be obtained.

The mean inter-particle distance of all the domains is more preferably from 70 nm to 350 nm, still more preferably from 110 nm to 300 nm, particularly preferably from 180 nm to 200 nm. The mean inter-particle distance of all the domains was calculated by observing the particles with a SPM and processing the resultant image with image analysis software (SPIP).

Detailed conditions for the observation with the scanning probe microscope used in the measurement of the ratio of the number of the domains (d) to the total number of the domains (d) and the domains (d'), the average cross-section area of all the domains, and the mean inter-particle distance of all the domains are described in Examples.

Although the reason why the polycarbonate-based resin composition of the present invention has impact resistance more excellent than that of a polycarbonate-based resin composition having a comparable polyorganosiloxane chain length or containing a comparable polyorganosiloxane block amount is unclear, a possible reason is as described below.

In the domain (d) of the polycarbonate-based resin composition according to the present invention, the domain (d-2) containing at least one selected from the block derived from the aromatic polycarbonate-based resin (B) and the polycarbonate block (A-1) is present inside the domain (d-1) containing the polyorganosiloxane block (A-2).

In this case, when the amount of the polyorganosiloxane block (A-2) in the polycarbonate-based resin composition is the same as that of the above comparable composition, the domain (d) including the domain (d-2) is increased in size as compared to the domain (d') formed only of the domain (d-1), and hence its size becomes larger than the size of the domain (d'). The size of the domain (d) present in the matrix entirely increases, and hence the propagation of a stress wave at the time of the application of an impact load to the polycarbonate-based resin composition may be further suppressed.

The content of the polyorganosiloxane block (A-2) in the polycarbonate-based resin composition of the present invention is preferably from 0.1 mass % to 10 mass %, more preferably from 0.5 mass % to 8.0 mass %, still more preferably from 1.0 mass % to 5.0 mass %, particularly preferably from 2.0 mass % to 4.0 mass %. When the content of the polyorganosiloxane block (A-2) in the polycarbonate-based resin composition falls within the range, an excellent impact-resisting characteristic can be obtained.

The viscosity-average molecular weight (Mv) of the polycarbonate-based resin composition of the present invention can be appropriately adjusted with a molecular weight modifier (terminal stopper) or the like so as to be a target molecular weight in accordance with applications and products in which the composition is used. The viscosity-average molecular weight of the polycarbonate-based resin composition is preferably from 9,000 to 50,000, more preferably from 12,000 to 30,000, still more preferably from 14,000 to 23,000, particularly preferably from 16,000 to 20,000. When the viscosity-average molecular weight is 9,000 or more, a sufficient strength of a molded article of the composition can be obtained. When the viscosity-average molecular weight is 50,000 or less, injection molding or extrusion molding can be performed at the temperature at which the heat deterioration of the composition does not occur.

The viscosity-average molecular weight (Mv) is a value calculated from Schnell's equation ($[\eta]=1.23\times10^{-5}\times Mv^{0.83}$) by measuring the limiting viscosity $[\eta]$ of a methylene chloride solution at 20° C.

<Polycarbonate-Polyorganosiloxane Copolymer (A)>

The domain (d-1) contains the following polyorganosiloxane block (A-2) of the polycarbonate-polyorganosiloxane copolymer (A), and is preferably formed of the polyorganosiloxane block (A-2). As described above, the polycarbonate-polyorganosiloxane copolymer (A) contains the polycarbonate block (A-1) formed of a repeating unit represented by the following general formula (I) and the polyorganosiloxane block (A-2) containing a repeating unit represented by the following general formula (II):

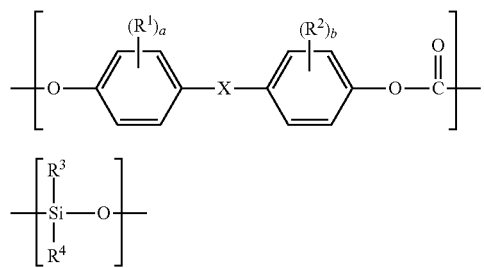

In the general formulae (I) and (II), $R^1$ to $R^4$, X, and a and b are as described above.

In the general formula (I), examples of the halogen atom that $R^1$ and $R^2$ each independently represent include a fluorine atom, a chlorine atom, a bromine atom, and an iodine atom.

Examples of the alkyl group that $R^1$ and $R^2$ each independently represent include a methyl group, an ethyl group, a n-propyl group, an isopropyl group, various butyl groups (the term "various" means that a linear group and all kinds of branched groups are included, and in this description, the same applies hereinafter), various pentyl groups, and various hexyl groups. Examples of the alkoxy group that $R^1$ and $R^2$ each independently represent include alkoxy groups having the above-mentioned alkyl groups as alkyl group moieties.

Examples of the alkylene group represented by X include a methylene group, an ethylene group, a trimethylene group, a tetramethylene group, and a hexamethylene group. Among them, an alkylene group having 1 to 5 carbon atoms is preferred. Examples of the alkylidene group represented by X include an ethylidene group and an isopropylidene group. Examples of the cycloalkylene group represented by X include a cyclopentanediyl group, a cyclohexanediyl group, and a cyclooctanediyl group. Among them, a cycloalkylene group having 5 to 10 carbon atoms is preferred. Examples of the cycloalkylidene group represented by X include a cyclohexylidene group, a 3,5,5-trimethylcyclohexylidene group, and a 2-adamantylidene group. Among them, a cycloalkylidene group having 5 to 10 carbon atoms is preferred, and a cycloalkylidene group having 5 to 8 carbon atoms is more preferred. Examples of the aryl moiety of the arylalkylene group represented by X include aryl groups each having 6 to 14 ring-forming carbon atoms, such as a phenyl group, a naphthyl group, a biphenyl group, and an anthryl group, and examples of the alkylene group include the above-mentioned alkylene groups. Examples of the aryl moiety of the arylalkylidene group represented by X include aryl groups each having 6 to 14 ring-forming carbon atoms, such as a phenyl group, a naphthyl group, a biphenyl group, and an anthryl group, and examples of the alkylidene group include the above-mentioned alkylidene groups.

In the general formula (I), a and b each independently represent an integer of from 0 to 4, preferably from 0 to 2, more preferably 0 or 1.

Among them, a repeating unit in which a and b each represent 0, and X represents a single bond or an alkylene group having 1 to 8 carbon atoms, or a repeating unit in which a and b each represent 0, and X represents an alkylene group having 3 carbon atoms, in particular an isopropylidene group is suitable.

In the general formula (II), examples of the halogen atom represented by $R^3$ or $R^4$ include a fluorine atom, a chlorine atom, a bromine atom, and an iodine atom. Examples of the alkyl group represented by $R^3$ or $R^4$ include a methyl group, an ethyl group, a n-propyl group, an isopropyl group, various butyl groups, various pentyl groups, and various hexyl groups. Examples of the alkoxy group represented by $R^3$ or $R^4$ include alkoxy groups having the above-mentioned alkyl groups as alkyl group moieties. Examples of the aryl group represented by $R^3$ or $R^4$ include a phenyl group and a naphthyl group.

$R^3$ and $R^4$ each preferably represent a hydrogen atom, an alkyl group having 1 to 6 carbon atoms, an alkoxy group having 1 to 6 carbon atoms, or an aryl group having 6 to 12 carbon atoms, and each more preferably represent a methyl group.

More specifically, the polyorganosiloxane block (A-2) containing the repeating unit represented by the general formula (II) preferably has a unit represented by any one of the following general formulae (II-I) to (II-III):

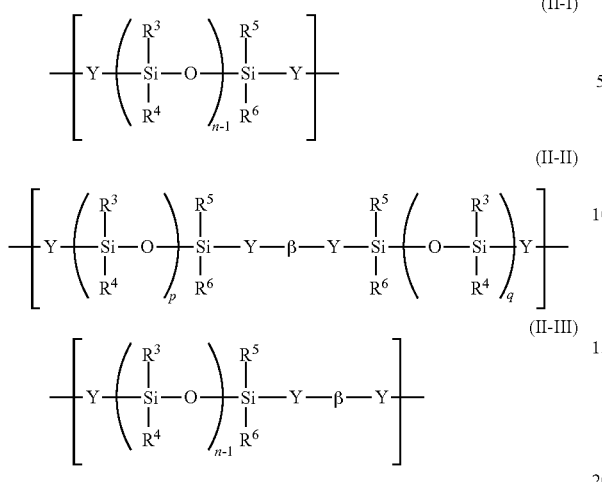

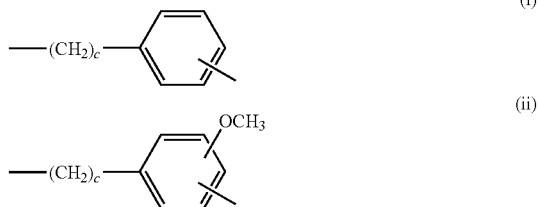

wherein $R^3$ to $R^6$ each independently represent a hydrogen atom, a halogen atom, an alkyl group having 1 to 6 carbon atoms, an alkoxy group having 1 to 6 carbon atoms, or an aryl group having 6 to 12 carbon atoms, and a plurality of $R^3$, $R^4$, $R^5$ or $R^6$ may be identical to or different from each other, Y represents —$R^7O$—, —$R^7COO$—, —$R^7NH$—, —$R^7NR^8$—, —COO—, —S—, —$R^7COO$—$R^9$—O—, or —$R^7O$—$R^{10}$—O—, and a plurality of Y may be identical to or different from each other, the $R^7$ represents a single bond, a linear, branched or cyclic alkylene group, an aryl-substituted alkylene group, a substituted or unsubstituted arylene group, or a diarylene group, $R^8$ represents an alkyl group, an alkenyl group, an aryl group, or an aralkyl group, $R^9$ represents a diarylene group, $R^{10}$ represents a linear, branched or cyclic alkylene group, or a diarylene group, β represents a divalent group derived from a diisocyanate compound, or a divalent group derived from a dicarboxylic acid or a halide of a dicarboxylic acid, n represents the chain length of the polyorganosiloxane, and n−1, and p and q each represent a number of repetitions of a polyorganosiloxane unit and each represent an integer of 1 or more, and a sum of p and q is n−2.

Examples of the halogen atom that $R^3$ to $R^6$ each independently represent include a fluorine atom, a chlorine atom, a bromine atom, and an iodine atom. Examples of the alkyl group that $R^3$ to $R^6$ each independently represent include a methyl group, an ethyl group, a n-propyl group, an isopropyl group, various butyl groups, various pentyl groups, and various hexyl groups. Examples of the alkoxy group that $R^3$ to $R^6$ each independently represent include alkoxy groups having the above-mentioned alkyl groups as alkyl group moieties. Examples of the aryl group that $R^3$ to $R^6$ each independently represent include a phenyl group and a naphthyl group.

$R^3$ to $R^6$ each preferably represent a hydrogen atom, an alkyl group having 1 to 6 carbon atoms, an alkoxy group having 1 to 6 carbon atoms, or an aryl group having 6 to 12 carbon atoms.

$R^3$ to $R^6$ in the general formula (II-I), the general formula (II-II), and/or the general formula (II-III) each preferably represent a methyl group.

The linear or branched alkylene group represented by $R^7$ in —$R^7O$—, —$R^7COO$—, —$R^7NH$—, —$R^7NR^8$—, —COO—, —S—, —$R^7COO$—$R^9$—O—, or —$R^7O$—$R^{10}$—O— represented by Y is, for example, an alkylene group having 1 to 8 carbon atoms, preferably 1 to 5 carbon atoms, and the cyclic alkylene group represented by $R^7$ is, for example, a cycloalkylene group having 5 to 15 carbon atoms, preferably 5 to 10 carbon atoms.

The aryl-substituted alkylene group represented by $R^7$ may have a substituent, such as an alkoxy group or an alkyl group, on its aromatic ring, and a specific structure thereof may be, for example, a structure represented by the following general formula (i) or (ii). When the block has the aryl-substituted alkylene group, the alkylene group is bonded to Si.

wherein c represents a positive integer and typically represents an integer of from 1 to 6.

The diarylene group represented by any one of $R^7$, $R^9$ and $R^{10}$ refers to a group in which two arylene groups are linked to each other directly or through a divalent organic group, and is specifically a group having a structure represented by —$Ar^1$—W—$Ar^2$—. Here, $Ar^1$ and $Ar^2$ each represent an arylene group, and W represents a single bond or a divalent organic group. Examples of the divalent organic group represented by W include an isopropylidene group, a methylene group, a dimethylene group, and a trimethylene group.

Examples of the arylene group represented by any one of $R^7$, $Ar^1$, and $Ar^2$ include arylene groups each having 6 to 14 ring-forming carbon atoms, such as a phenylene group, a naphthylene group, a biphenylene group, and an anthrylene group. Those arylene groups may each have an arbitrary substituent, such as an alkoxy group or an alkyl group.

The alkyl group represented by $R^8$ is a linear or branched group having 1 to 8, preferably 1 to 5 carbon atoms. The alkenyl group represented by $R^8$ is, for example, a linear or branched group having 2 to 8, preferably 2 to 5 carbon atoms. The aryl group represented by $R^8$ is, for example, a phenyl group or a naphthyl group. The aralkyl group represented by $R^8$ is, for example, a phenylmethyl group or a phenylethyl group.

The linear, branched, or cyclic alkylene group represented by $R^{10}$ is the same as that represented by $R^7$.

Y preferably represents —$R^7O$—. $R^7$ preferably represents an aryl-substituted alkylene group, in particular a residue of a phenol-based compound having an alkyl group, and more preferably represents an organic residue derived from allylphenol or an organic residue derived from eugenol.

With regard to p and q in the formula (II-II), it is preferred that p=q.

β represents a divalent group derived from a diisocyanate compound, or a divalent group derived from a dicarboxylic acid or a halide of a dicarboxylic acid, and examples thereof include divalent groups represented by the following general formulae (iii) to (vii).

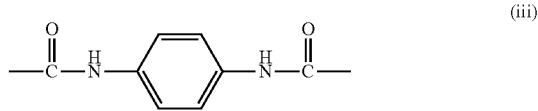

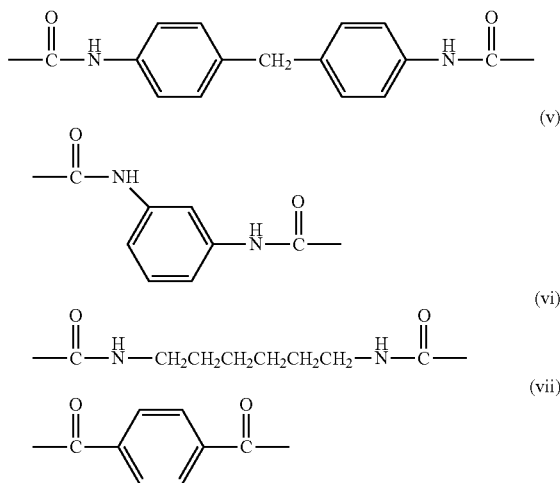

The average chain length n of the polyorganosiloxane block (A-2) in the PC-POS copolymer (A) is preferably from 30 to 500, more preferably from 35 to 400, still more preferably from 40 to 400, still further more preferably from 50 to 300, particularly preferably from 55 to 120. The average chain length is calculated by nuclear magnetic resonance (NMR) measurement. When the average chain length n falls within the range of from 30 to 500, more excellent impact resistance can be obtained. In addition, the average chain length n of the polyorganosiloxane block (A-2) also preferably falls within the range of from 55 to 500.

The content of the polyorganosiloxane block (A-2) in the PC-POS copolymer (A) is preferably from 5 mass % to 70 mass %, more preferably from 6 mass % to 50 mass %, still more preferably from 10 mass % to 45 mass %, particularly preferably from 21 mass % to 40 mass %. When the amount of the polyorganosiloxane block in the PC-POS copolymer (A) falls within the range, more excellent impact resistance can be obtained.

The viscosity-average molecular weight (Mv) of the PC-POS copolymer (A) can be appropriately adjusted with a molecular weight modifier (terminal stopper) or the like so as to be a target molecular weight in accordance with applications and products in which the copolymer is used. The viscosity-average molecular weight is preferably from 9,000 to 50,000, more preferably from 12,000 to 30,000, still more preferably from 14,000 to 23,000, particularly preferably from 16,000 to 22,000, most preferably from 16,000 to 20,000. When the viscosity-average molecular weight is 9,000 or more, a sufficient strength of a molded article of the copolymer can be obtained. When the viscosity-average molecular weight is 50,000 or less, injection molding or extrusion molding can be performed at the temperature at which the heat deterioration of the copolymer does not occur.

The viscosity-average molecular weight (Mv) is a value calculated from Schnell's equation ($[\eta]=1.23\times10^{-5}\times Mv^{0.83}$) by measuring the limiting viscosity $[\eta]$ of a methylene chloride solution at 20° C.

The polycarbonate-polyorganosiloxane copolymer (A) can be produced by a known production method, such as an interfacial polymerization method (phosgene method), a pyridine method, or an ester exchange method. Particularly in the case of the interfacial polymerization method, a step of separating an organic phase containing the PC-POS copolymer (A) and an aqueous phase containing an unreacted product, a catalyst residue, or the like becomes easier, and hence the separation of the organic phase containing the PC-POS copolymer (A) and the aqueous phase in each washing step based on alkali washing, acid washing, or pure water washing becomes easier. Accordingly, the PC-POS copolymer (A) is efficiently obtained. With regard to a method of producing the PC-POS copolymer (A), reference can be made to, for example, a method described in JP 2010-241943 A.

Specifically, the PC-POS copolymer (A) can be produced by: dissolving a polycarbonate oligomer produced in advance to be described later and a polyorganosiloxane in a water-insoluble organic solvent (e.g., methylene chloride); adding a solution of a dihydric phenol-based compound (e.g., bisphenol A) in an aqueous alkaline compound (e.g., aqueous sodium hydroxide) to the solution; and subjecting the mixture to an interfacial polycondensation reaction through the use of a tertiary amine (e.g., triethylamine) or a quaternary ammonium salt (e.g., trimethylbenzylammonium chloride) as a polymerization catalyst in the presence of a terminal stopper (a monohydric phenol, such as p-t-butylphenol). In addition, the PC-POS copolymer (A) can also be produced by copolymerizing the polyorganosiloxane and a dihydric phenol, and phosgene, a carbonate, or a chloroformate.

When the polycarbonate-polyorganosiloxane copolymer (A) in the polycarbonate-based resin composition of the present invention is produced by, for example, causing the polycarbonate oligomer and a polyorganosiloxane raw material to react with each other in an organic solvent, and then causing the resultant to react with the dihydric phenol, the solid matter weight (g/L) of the polycarbonate oligomer in 1 L of a mixed solution of the organic solvent and the polycarbonate oligomer falls within the range of preferably from 80 g/L to 200 g/L, more preferably from 90 g/L to 180 g/L, still more preferably from 100 g/L to 170 g/L.

A polyorganosiloxane represented by the following general formula (1), general formula (2), and/or general formula (3) can be used as the polyorganosiloxane serving as a raw material:

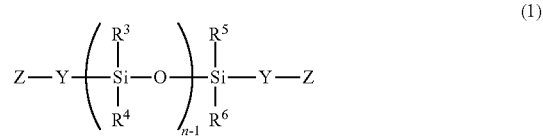

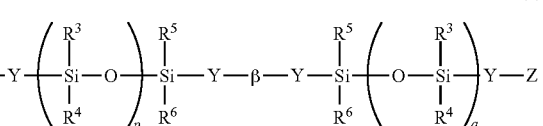

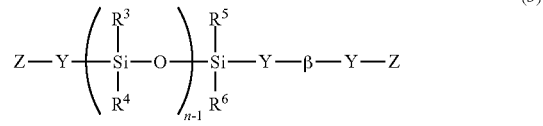

wherein, $R^3$ to $R^6$, Y, β, n-1, p and q are as described above, and specific examples and preferred examples thereof are also the same as those described above, and Z represents a hydrogen atom or a halogen atom, and a plurality of Z may be identical to or different from each other.
Examples of the polyorganosiloxane represented by the general formula (1) include compounds each represented by any one of the following general formulae (1-1) to (1-11):
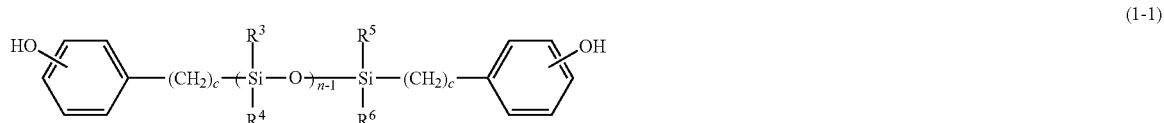
(1-1)
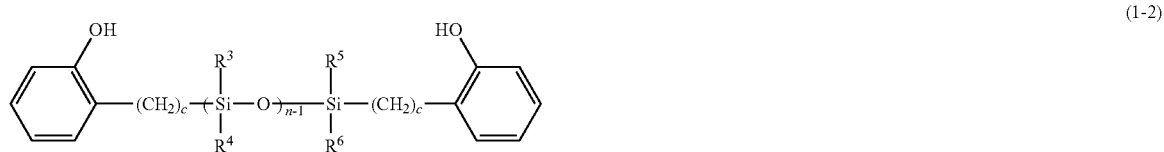
(1-2)
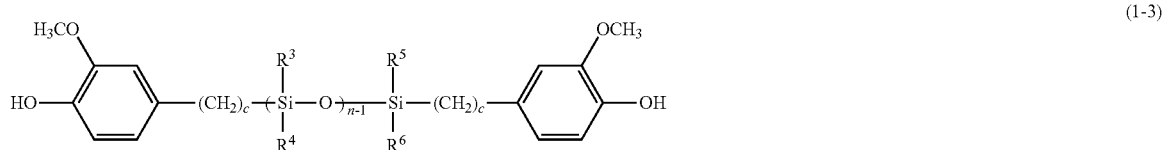
(1-3)
(1-4)
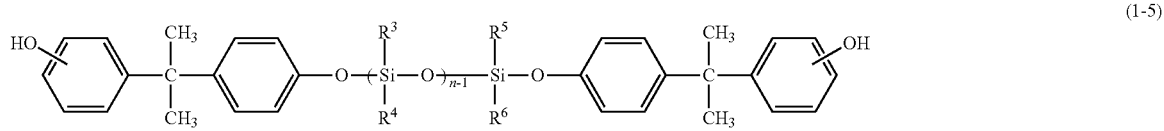
(1-5)
(1-6)
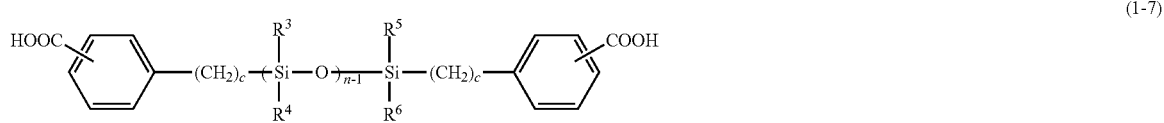
(1-7)
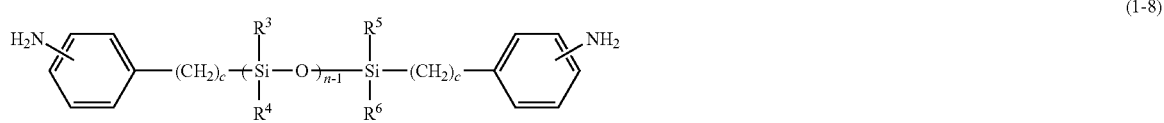
(1-8)
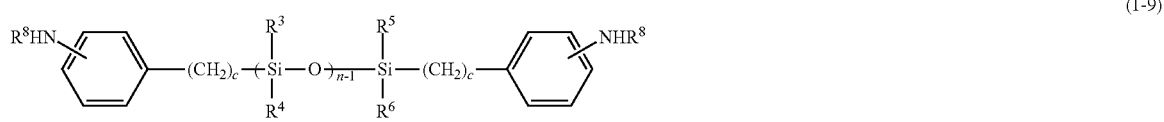
(1-9)
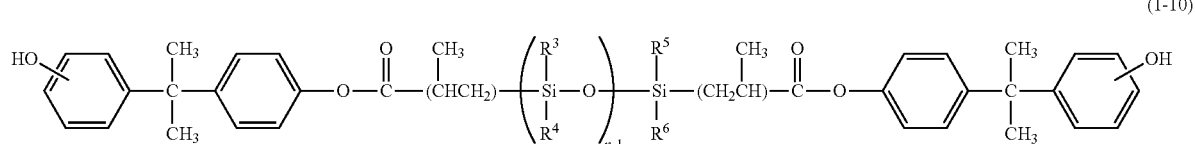
(1-10)
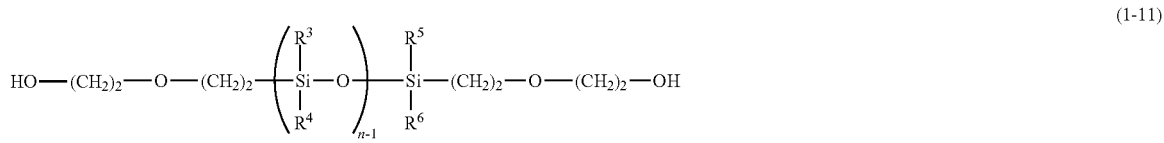
(1-11)

In the general formulae (1-1) to (1-11), $R^3$ to $R^6$, n, and $R^8$ are as defined above, and preferred examples thereof are also the same as those described above, and c represents a positive integer and typically represents an integer of from 1 to 6.

Among them, a phenol-modified polyorganosiloxane represented by the general formula (1-1) is preferred from the viewpoint of its ease of polymerization. In addition, an α,ω-bis[3-(o-hydroxyphenyl)propyl]polydimethylsiloxane, which is one of compound represented by the general formula (1-2), or an α,ω-bis[3-(4-hydroxy-3-methoxyphenyl)propyl]polydimethylsiloxane, which is one of compound represented by the general formula (1-3), is preferred from the viewpoint of its ease of availability.

In addition to the foregoing, a compound having a structure represented by the following general formula (4) may be used as a polyorganosiloxane raw material:

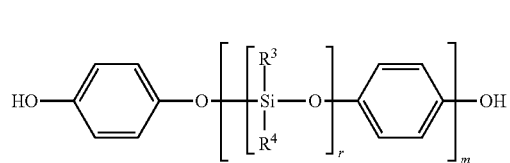

(4)

wherein $R^3$ and $R^4$ are identical to those described above. The average chain length of the polyorganosiloxane block represented by the general formula (4) is (r×m), and the range of the (r×m) is the same as that of the n.

When the compound represented by the general formula (4) is used as a polyorganosiloxane raw material, the polyorganosiloxane block (A-2) preferably has a unit represented by the following general formula (II-IV):

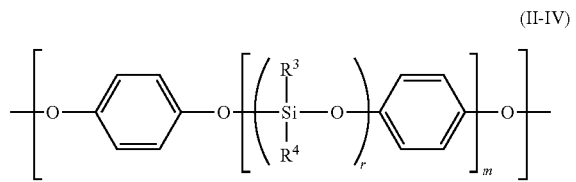

(II-IV)

wherein $R^3$, $R^4$, r, and m are as described above.

A method of producing the polyorganosiloxane is not particularly limited. According to, for example, a method described in JP 11-217390 A, a crude polyorganosiloxane can be obtained by: causing cyclotrisiloxane and disiloxane to react with each other in the presence of an acid catalyst to synthesize α,ω-dihydrogen organopentasiloxane; and then subjecting the α,ω-dihydrogen organopentasiloxane to an addition reaction with, for example, a phenolic compound (e.g., 2-allylphenol, 4-allylphenol, eugenol, or 2-propenylphenol) in the presence of a catalyst for a hydrosilylation reaction. In addition, according to a method described in JP 2662310 B2, the crude polyorganosiloxane can be obtained by: causing octamethylcyclotetrasiloxane and tetramethyldisiloxane to react with each other in the presence of sulfuric acid (acid catalyst); and subjecting the resultant α,ω-dihydrogen organopolysiloxane to an addition reaction with the phenolic compound or the like in the presence of the catalyst for a hydrosilylation reaction in the same manner as that described above. The α,ω-dihydrogen organopolysiloxane may be used after its chain length n has been appropriately adjusted in accordance with its polymerization conditions, or a commercial α,ω-dihydrogen organopolysiloxane may be used.

Examples of the catalyst for a hydrosilylation reaction include transition metal-based catalysts. Among them, a platinum-based catalyst is preferably used in terms of a reaction rate and selectivity. Specific examples of the platinum-based catalyst include chloroplatinic acid, an alcohol solution of chloroplatinic acid, an olefin complex of platinum, a complex of platinum and a vinyl group-containing siloxane, platinum-supported silica, and platinum-supported activated carbon.

The crude polyorganosiloxane is preferably brought into contact with an adsorbent to cause the adsorbent to adsorb and remove a transition metal derived from a transition metal-based catalyst in the crude polyorganosiloxane, the catalyst having been used as the catalyst for a hydrosilylation reaction.

An adsorbent having an average pore diameter of, for example, 1,000 Å or less can be used as the adsorbent. When the average pore diameter is 1,000 Å or less, the transition metal in the crude polyorganosiloxane can be efficiently removed. From such viewpoint, the average pore diameter of the adsorbent is preferably 500 Å or less, more preferably 200 Å or less, still more preferably 150 Å or less, still further more preferably 100 Å or less. From the same viewpoint, the adsorbent is preferably a porous adsorbent.

Although the adsorbent is not particularly limited as long as the adsorbent has the above-mentioned average pore diameter, for example, activated clay, acid clay, activated carbon, synthetic zeolite, natural zeolite, activated alumina, silica, a silica-magnesia-based adsorbent, diatomaceous earth, or cellulose can be used, and at least one selected from the group consisting of activated clay, acid clay, activated carbon, synthetic zeolite, natural zeolite, activated alumina, silica, and a silica-magnesia-based adsorbent is preferred.

After the adsorbent has been caused to adsorb the transition metal in the crude polyorganosiloxane, the adsorbent can be separated from the polyorganosiloxane by arbitrary separating means. Examples of the means for separating the adsorbent from the polyorganosiloxane include a filter and centrifugal separation. When the filter is used, a filter, such as a membrane filter, a sintered metal filter, or a glass fiber filter, can be used. Among them, a membrane filter is particularly preferably used.

The average particle diameter of the adsorbent is typically from 1 μm to 4 mm, preferably from 1 μm to 100 μm from the viewpoint that the adsorbent is separated from the polyorganosiloxane after the adsorption of the transition metal.

When the adsorbent is used, its usage amount is not particularly limited. The porous adsorbent can be used in an amount in the range of preferably from 1 part by mass to 30 parts by mass, more preferably from 2 parts by mass to 20 parts by mass with respect to 100 parts by mass of the crude polyorganosiloxane.

When the crude polyorganosiloxane to be treated has so high a molecular weight that the polyorganosiloxane is not in a liquid state, the polyorganosiloxane may be heated to such a temperature as to be in a liquid state at the time of the performance of the adsorption with the adsorbent and the separation of the adsorbent. Alternatively, the adsorption and the separation may be performed after the polyorganosiloxane has been dissolved in a solvent, such as methylene chloride or hexane.

A polyorganosiloxane having a desired molecular weight distribution is obtained by regulating its molecular weight distribution through, for example, the blending of a plurality of polyorganosiloxanes. With regard to the blending, a crude polyorganosiloxane having a desired molecular weight distribution can be obtained by blending a plurality of α,ω-dihydrogen organopolysiloxanes and then subjecting a phenolic compound or the like to an addition reaction with the resultant in the presence of a catalyst for a hydrosilylation reaction. In addition, purification, such as the removal of the catalyst for a hydrosilylation reaction, may be performed after a plurality of crude polyorganosiloxanes have been blended, and a plurality of polyorganosiloxanes after the purification may be blended. Furthermore, a molecular weight distribution can be appropriately adjusted depending on a polymerization condition at the time of the production of a polyorganosiloxane. In addition, a desired molecular weight distribution can be obtained by fractionating only part of existing polyorganosiloxanes through means such as various kinds of separation.

The polycarbonate oligomer can be produced by a reaction between a dihydric phenol and a carbonate precursor, such as phosgene or triphosgene, in an organic solvent, such as methylene chloride, chlorobenzene, or chloroform. When the polycarbonate oligomer is produced by using an ester exchange method, the oligomer can be produced by a reaction between the dihydric phenol and a carbonate precursor, such as diphenyl carbonate.

A dihydric phenol represented by the following general formula (viii) is preferably used as the dihydric phenol:

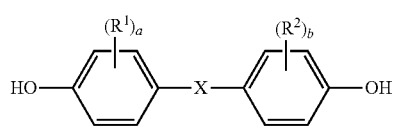

(viii)

wherein $R^1$, $R^2$, a, b, and X are as described above.

Examples of the dihydric phenol represented by the general formula (viii) include: bis(hydroxyphenyl)alkane dihydric phenols, such as 2,2-bis(4-hydroxyphenyl)propane [bisphenol A], bis(4-hydroxyphenyl)methane, 1,1-bis(4-hydroxyphenyl)ethane, and 2,2-bis(4-hydroxy-3,5-dimethylphenyl)propane; 4,4'-dihydroxydiphenyl; bis(4-hydroxyphenyl)cycloalkanes; bis(4-hydroxyphenyl) oxide; bis(4-hydroxyphenyl) sulfide; bis(4-hydroxyphenyl) sulfone; bis(4-hydroxyphenyl) sulfoxide; and bis(4-hydroxyphenyl) ketone. Those dihydric phenols may be used alone or as a mixture thereof.

Among them, bis(hydroxyphenyl)alkane dihydric phenols are preferred, and bisphenol A is more preferred. When bisphenol A is used as the dihydric phenol, the PC-POS copolymer is such that in the general formula (i), X represents an isopropylidene group and a=b=0.

Examples of the dihydric phenol except bisphenol A include bis(hydroxyaryl)alkanes, bis(hydroxyaryl)cycloalkanes, dihydroxyaryl ethers, dihydroxydiaryl sulfides, dihydroxydiaryl sulfoxides, dihydroxydiaryl sulfones, dihydroxydiphenyls, dihydroxydiaryl fluorenes, and dihydroxydiaryl adamantanes. Those dihydric phenols may be used alone or as a mixture thereof.

Examples of the bis(hydroxyaryl)alkanes include bis(4-hydroxyphenyl)methane, 1,1-bis(4-hydroxyphenyl)ethane, 2,2-bis(4-hydroxyphenyl)butane, 2,2-bis(4-hydroxyphenyl)octane, bis(4-hydroxyphenyl)phenylmethane, bis(4-hydroxyphenyl)diphenylmethane, 2,2-bis(4-hydroxy-3-methylphenyl)propane, bis(4-hydroxyphenyl)naphthylmethane, 1,1-bis(4-hydroxy-3-t-butylphenyl)propane, 2,2-bis(4-hydroxy-3-bromophenyl)propane, 2,2-bis(4-hydroxy-3,5-dimethylphenyl)propane, 2,2-bis(4-hydroxy-3-chlorophenyl)propane, 2,2-bis(4-hydroxy-3,5-dichlorophenyl)propane, and 2,2-bis(4-hydroxy-3,5-dibromophenyl)propane.

Examples of the bis(hydroxyaryl)cycloalkanes include 1,1-bis(4-hydroxyphenyl)cyclopentane, 1,1-bis(4-hydroxyphenyl)cyclohexane, 1,1-bis(4-hydroxyphenyl)-3,5,5-trimethylcyclohexane, 2,2-bis(4-hydroxyphenyl)norbornane, and 1,1-bis(4-hydroxyphenyl)cyclododecane. Examples of the dihydroxyaryl ethers include 4,4'-dihydroxydiphenyl ether and 4,4'-dihydroxy-3,3'-dimethylphenyl ether.

Examples of the dihydroxydiaryl sulfides include 4,4'-dihydroxydiphenyl sulfide and 4,4'-dihydroxy-3,3'-dimethyldiphenyl sulfide. Examples of the dihydroxydiaryl sulfoxides include 4,4'-dihydroxydiphenyl sulfoxide and 4,4'-dihydroxy-3,3'-dimethyldiphenyl sulfoxide. Examples of the dihydroxydiaryl sulfones include 4,4'-dihydroxydiphenyl sulfone and 4,4'-dihydroxy-3,3'-dimethyldiphenyl sulfone.

An example of the dihydroxydiphenyls is 4,4'-dihydroxydiphenyl. Examples of the dihydroxydiarylfluorenes include 9,9-bis(4-hydroxyphenyl)fluorene and 9,9-bis(4-hydroxy-3-methylphenyl)fluorene. Examples of the dihydroxydiaryladamantanes include 1,3-bis(4-hydroxyphenyl)adamantane, 2,2-bis(4-hydroxyphenyl)adamantane, and 1,3-bis(4-hydroxyphenyl)-5,7-dimethyladamantane.

Examples of dihydric phenols except those described above include 4,4'-[1,3-phenylenebis(1-methylethylidene)]bisphenol, 10,10-bis(4-hydroxyphenyl)-9-anthrone, and 1,5-bis(4-hydroxyphenylthio)-2,3-dioxapentane.

In order to adjust the molecular weight of the PC-POS copolymer to be obtained, a terminal stopper (molecular weight modifier) may be used. Examples of the terminal stopper include monohydric phenols, such as phenol, p-cresol, p-tert-butylphenol, p-tert-octylphenol, p-cumylphenol, p-nonylphenol, m-pentadecylphenol, and p-tert-amylphenol. Those monohydric phenols may be used alone or in combination thereof.

After the interfacial polycondensation reaction, the PC-POS copolymer (A) can be obtained by appropriately leaving the resultant at rest to separate the resultant into an aqueous phase and an organic solvent phase [separating step], washing the organic solvent phase (preferably washing the phase with a basic aqueous solution, an acidic aqueous solution and water, in order) [washing step], concentrating the resultant organic phase [concentrating step], and drying the concentrated phase [drying step].

<(B) Aromatic Polycarbonate-Based Resin>

The aromatic polycarbonate-based resin (B) except the polycarbonate-polyorganosiloxane copolymer (A) forms the matrix moiety of the polycarbonate-based resin composition of the present invention, and is incorporated into the domain (d-2).

The aromatic polycarbonate-based resin (B) contains a polycarbonate block comprising, in a main chain thereof, a repeating unit represented by the following general formula (III). The polycarbonate-based resin is not particularly limited, and various known polycarbonate-based resins can be used.

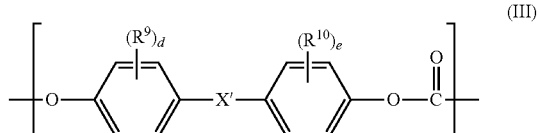

(III)

wherein $R^9$ and $R^{10}$ each independently represent a halogen atom, an alkyl group having 1 to 6 carbon atoms, or an alkoxy group having 1 to 6 carbon atoms, X' represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, —S—, —SO—, —SO$_2$—, —O—, or —CO—, and d and e each independently represent an integer of from 0 to 4.

Specific examples of $R^9$ and $R^{10}$ include the same examples as those of $R^1$ and $R^2$, and preferred examples thereof are also the same as those of $R^1$ and $R^2$. $R^9$ and $R^{10}$ each more preferably represent an alkyl group having 1 to 6 carbon atoms or an alkoxy group having 1 to 6 carbon atoms. Specific examples of X' include the same examples as those of X, and preferred examples thereof are also the same as those of X. d and e each independently represent preferably from 0 to 2, more preferably 0 or 1.

Specifically, a resin obtained by a conventional production method for a polycarbonate can be used as the aromatic polycarbonate-based resin (B). Examples of the conventional method include: an interfacial polymerization method involving causing the dihydric phenol-based compound and phosgene to react with each other in the presence of an organic solvent inert to the reaction and an aqueous alkaline solution, adding a polymerization catalyst, such as a tertiary amine or a quaternary ammonium salt, to the resultant, and polymerizing the mixture; and a pyridine method involving dissolving the dihydric phenol-based compound in pyridine or a mixed solution of pyridine and an inert solvent, and introducing phosgene to the solution to directly produce the resin.

A molecular weight modifier (terminal stopper), a branching agent, or the like is used as required in the reaction.

The dihydric phenol-based compound is, for example, a compound represented by the following general formula (III'):

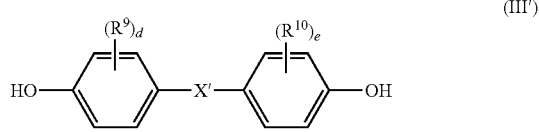

wherein $R^9$, $R^{10}$, d, and e are as defined above, and preferred examples thereof are also the same as those described above.

Specific examples of the dihydric phenol-based compound may include those described above in the method of producing the polycarbonate-polyorganosiloxane copolymer (A), and preferred examples thereof are also the same as those described above. Among them, bis(hydroxyphenyl) alkane-based dihydric phenols are preferred, and bisphenol A is more preferred.

The aromatic polycarbonate-based resins may be used alone or in combination thereof. The aromatic polycarbonate resin (B) may have a structure free of such a polyorganosiloxane block as represented by the formula (II) unlike the polycarbonate-polyorganosiloxane copolymer (A). For example, the aromatic polycarbonate-based resin (B) may be a homopolycarbonate resin.

<Other Components>

Any other additive can be incorporated into the polycarbonate-based resin composition of the present invention to the extent that the effects of the present invention are not impaired. Examples of the other additive may include a flame retardant, a flame retardant aid, a release agent, a reinforcing material, a filler, an elastomer for an impact resistance improvement, a dye, and a pigment.

The polycarbonate-based resin composition of the present invention is obtained by: blending the above-mentioned respective components at the above-mentioned ratios and various optional components to be used as required at appropriate ratios; and kneading the components.

The blending and the kneading may be performed by a method involving premixing with a typically used apparatus, such as a ribbon blender or a drum tumbler, and using, for example, a Henschel mixer, a Banbury mixer, a single-screw extruder, a twin-screw extruder, a multi-screw extruder, or a Ko-kneader. In normal cases, a heating temperature at the time of the kneading is appropriately selected from the range of from 240° C. to 320° C. An extruder, in particular a vented extruder is preferably used in the melt-kneading.

[Molded Article]

Various molded bodies can each be produced by an injection molding method, an injection compression molding method, an extrusion molding method, a blow molding method, a press molding method, a vacuum molding method, an expansion molding method, or the like using as a raw material the melt-kneaded polycarbonate-based resin composition of the present invention or a pellet obtained through the melt-kneading. In particular, the pellet obtained through the melt-kneading can be suitably used in the production of injection-molded bodies by injection molding and injection compression molding.

The molded article comprising the polycarbonate-based resin composition of the present invention can be suitably used as, for example: a casing for a part for electrical and electronic equipment, such as a television, a radio-cassette player, a video camera, a videotape recorder, an audio player, a DVD player, an air conditioner, a cellular phone, a display, a computer, a register, an electronic calculator, a copying machine, a printer, or a facsimile; or a part for an automobile and a building material.

EXAMPLES

The present invention is more specifically described by way of Examples. However, the present invention is by no means limited by these Examples. In each of Examples, characteristic values and evaluation results were determined in the following manner.

(1) Chain Length and Content of Polydimethylsiloxane

The chain length and content of a polydimethylsiloxane were calculated by NMR measurement from the integrated value ratio of a methyl group of the polydimethylsiloxane.

<Quantification Method for Chain Length of Polydimethylsiloxane>

$^1$H-NMR Measurement Conditions

NMR apparatus: ECA500 manufactured by JEOL Resonance Co., Ltd.

Probe: 50TH5AT/FG2

Observed range: −5 ppm to 15 ppm

Observation center: 5 ppm

Pulse repetition time: 9 sec

Pulse width: 45°

NMR sample tube: 5 φ

Sample amount: 30 mg to 40 mg

Solvent: deuterochloroform

Measurement temperature: room temperature

Number of Scans: 256 times

In the Case of Allylphenol-Terminated Polydimethylsiloxane

A: an integrated value of a methyl group in a dimethylsiloxane moiety observed around δ −0.02 to δ 0.5

B: an integrated value of a methylene group in allylphenol observed around δ 2.50 to δ 2.75

Chain length of polydimethylsiloxane=(A/6)/(B/4)

In the Case of Eugenol-Terminated Polydimethylsiloxane

A: an integrated value of a methyl group in a dimethylsiloxane moiety observed around δ −0.02 to δ 0.5

B: an integrated value of a methylene group in eugenol observed around δ 2.40 to δ 2.70
Chain length of polydimethylsiloxane=(A/6)/(B/4)
<Quantification Method for Content of Polydimethylsiloxane in PC-POS Copolymer>
e.g.) Quantification method for the copolymerization amount of a polydimethylsiloxane in a PTBP-terminated polycarbonate obtained by copolymerizing an allylphenol-terminated polydimethylsiloxane
NMR apparatus: ECA-500 manufactured by JEOL Resonance Co., Ltd.
Probe: TH5 corresponding to 5 φ NMR sample tube
Observed range: −5 ppm to 15 ppm
Observation center: 5 ppm
Pulse repetition time: 9 sec
Pulse width: 45°
Number of Scans: 256 times
NMR sample tube: 5 φ
Sample amount: 30 mg to 40 mg
Solvent: deuterochloroform
Measurement temperature: room temperature
A: an integrated value of a methyl group in a BPA moiety observed around δ 1.5 to δ 1.9
B: an integrated value of a methyl group in a dimethylsiloxane moiety observed around δ −0.02 to δ 0.3
C: an integrated value of a butyl group in a p-tert-butylphenyl moiety observed around δ 1.2 to δ 1.4

$$a=A/6$$

$$b=B/6$$

$$c=C/9$$

$$T=a+b+c$$

$$f=a/T \times 100$$

$$g=b/T \times 100$$

$$h=c/T \times 100$$

$$TW=f \times 254 + g \times 74.1 + h \times 149$$

$$PDMS\ (wt\ \%) = g \times 74.1/TW \times 100$$

(2) Viscosity-Average Molecular Weights of Polycarbonate-Polyorganosiloxane Copolymer and Polycarbonate-Based Resin Composition A viscosity-average molecular weight (Mv) was calculated from the following equation (Schnell's equation) by using a limiting viscosity [η] determined through the measurement of the viscosity of a methylene chloride solution at 20° C. with an Ubbelohde-type viscometer.

$$[\eta]=1.23 \times 10^{-5} \times Mv^{0.83}$$

<Method of Observing Domain Structure with SPM>
SPM apparatus: Nano-IM (manufactured by PNI)
Probe: PPP-NCHR (manufactured by Nanosensors)
Size of observation field of view: A 1-micrometer square, a 2-micrometer square, or a 5-micrometer square
Observed site: A surface formed of the machine direction (MD) and thickness direction (ND) of the central portion of a section distant from the end portion of an Izod test piece (measuring 63.5 mm long by 3.2 mm wide by 12.7 mm thick) on a side opposite to a gate by about 5 mm
Pretreatment method: Cutting section processing with a freezing microtome (apparatus: ULTRACUT® (manufactured by Leica Microsystems))
Measurement mode: A phase difference mode
Domain to be evaluated: A domain whose entirety was reflected in an observation field of view was defined as a domain to be evaluated. Size of observation field of view to be used in domain evaluation: When the number of domains to be evaluated in the case of observation in a 1-micrometer square was 21 or more, the 1-micrometer square was defined as the size of an observation field of view to be used in a domain evaluation, when the number was 6 or more and 20 or less, a 2-micrometer square was defined as the size of the observation field of view to be used in the domain evaluation, and when the number was 5 or less, a 5-micrometer square was defined as the size of the observation field of view to be used in the domain evaluation. Number of domains to be observed: The observation number of domains to be evaluated to be used in the calculation of the ratio of the number of the domains (d), the average cross-section area of the domains, and the mean inter-particle distance of the domains was set to 70 or more. When the number of domains to be evaluated per one observation field of view was less than 70, additional observation was performed until the number became 70 or more.
Image analysis software: SPIP
<Judgment of Presence/Absence of Domain (d) with SPM, and Methods of Calculating Number of (d-2) Inside (d-1) and Ratio of Number of Domains (d) to Total Number of all Domains>

The number of all domains to be evaluated was automatically calculated with the SPIP, and the number of the domains (d) was visually counted.
<Method of Calculating Average Cross-Section Area of Domains with SPM>

The cross-section areas of the respective domains were automatically calculated by subjecting the domains to image processing with the SPIP, and their average was calculated.
<Method of Calculating Mean Inter-Particle Distance with SPM>

Distances between the adjacent particles of the respective domains were automatically calculated with the SPIP, and their average was calculated.
<Production of Polycarbonate Oligomer>

Sodium dithionite was added in an amount of 2,000 ppm with respect to bisphenol A (BPA) (to be dissolved later) to 5.6 mass % aqueous sodium hydroxide, and then BPA was dissolved in the mixture so that the concentration of BPA was 13.5 mass %. Thus, a solution of BPA in aqueous sodium hydroxide was prepared. The solution of BPA in aqueous sodium hydroxide, methylene chloride, and phosgene were continuously passed through a tubular reactor having an inner diameter of 6 mm and a tube length of 30 m at flow rates of 40 L/hr, 15 L/hr, and 4.0 kg/hr, respectively. The tubular reactor had a jacket portion and the temperature of the reaction liquid was kept at 40° C. or less by passing cooling water through the jacket. The reaction liquid that had exited the tubular reactor was continuously introduced into a baffled vessel type reactor provided with a sweptback blade and having an internal volume of 40 L. The solution of BPA in aqueous sodium hydroxide, 25 mass % aqueous sodium hydroxide, water, and a 1 mass % aqueous solution of triethylamine were further added to the reactor at flow rates of 2.8 L/hr, 0.07 L/hr, 17 L/hr, and 0.64 L/hr, respectively, to perform a reaction. An aqueous phase was separated and removed by continuously taking out the reaction liquid overflowing the vessel type reactor and leaving the reaction liquid at rest. Then, a methylene chloride phase was collected.

The polycarbonate oligomer thus obtained had a concentration of 330 g/L and a chloroformate group concentration of 0.71 mol/L.

Production Examples 1 to 17 of
Polycarbonate-Polyorganosiloxane Copolymer (A)

Values for the following (i) to (xiv) are as shown in Table 1-1 and Table 1-2.

(i) L of the polycarbonate oligomer solution (PCO) produced as described above, (ii) L of methylene chloride (MC), a solution obtained by dissolving (iv) g of an allylphenol terminal-modified polydimethylsiloxane (a polydimethylsiloxane is hereinafter sometimes referred to as "PDMS") having an average chain length n of (iii) in (v) L of methylene chloride (MC), and (vi) mL of triethylamine (TEA) were loaded into a 50-liter vessel-type reactor including a baffle board, a paddle-type stirring blade, and a cooling jacket. (vii) g of 6.4 mass % aqueous sodium hydroxide (NaOHaq) was added to the mixture under stirring, and a reaction between the polycarbonate oligomer and the allylphenol terminal-modified PDMS was performed for 20 minutes.

A solution of p-t-butylphenol (PTBP) in methylene chloride (obtained by dissolving (viii) g of PTBP in (ix) L of methylene chloride (MC)) and a solution of BPA in aqueous sodium hydroxide (obtained by dissolving (xiii) g of BPA in an aqueous solution obtained by dissolving (x) g of NaOH and (xi) g of sodium dithionite ($Na_2S_2O_4$) in (xii) L of water) were added to the polymerization liquid, and the mixture was subjected to a polymerization reaction for 40 minutes.

(xiv) L of methylene chloride (MC) was added to the resultant for dilution, and the mixture was stirred for 10 minutes. After that, the mixture was separated into an organic phase containing a PC-POS, and an aqueous phase containing excess amounts of BPA and NaOH, and the organic phase was isolated.

A solution of the PC-POS in methylene chloride thus obtained was sequentially washed with 0.03 mol/L aqueous NaOH and 0.2 mol/L hydrochloric acid in amounts of 15 vol % each with respect to the solution. Next, the solution was repeatedly washed with pure water until an electric conductivity in an aqueous phase after the washing became 0.01 μS/m or less.

The solutions of the polycarbonates in methylene chloride obtained by the washing were concentrated and pulverized, and the resultant flakes were dried under reduced pressure at 120° C. to provide PC-POS copolymers (A1) to (A17). The PDMS contents and viscosity-average molecular weights of the resultant flakes were measured.

TABLE 1-1

|  | Production Examples | | | | | | |
|---|---|---|---|---|---|---|---|
|  | 1 | 2 | 3 | 4 | 5 | 6 | 7 |
| PC-POS (A) | A1 | A2 | A3 | A4 | A5 | A6 | A7 |
| (i) PCO (L) | 12 | 12 | 11 | 12 | 10 | 10 | 11 |
| (ii) MC (L) | 6.3 | 5.8 | 4.7 | 27.6 | 21.8 | 21.8 | 23.9 |
| (iii) PDMS chain length (n) | 39 | 39 | 39 | 61 | 61 | 61 | 91 |
| (iv) PDMS loading amount (g) | 1,150 | 1,900 | 2,700 | 1,150 | 1,650 | 2,500 | 1,050 |
| (v) MC (L) | 1.5 | 2 | 2.5 | 1 | 2 | 2 | 2 |
| (vi) TEA (mL) | 6.7 | 6.7 | 6.2 | 6.6 | 5.5 | 5.5 | 6.1 |
| (vii) NaOHaq (g) | 1,302 | 1,302 | 1,194 | 867 | 1,084 | 1,084 | 762 |
| (viii) PTBP (g) | 62.2 | 62.2 | 57 | 55.1 | 45.9 | 45.9 | 52.8 |
| (ix) MC (L) | 0.5 | 0.5 | 0.5 | 0.5 | 0.5 | 0.5 | 0.3 |
| (x) NaOH (g) | 450 | 450 | 412 | 444 | 370 | 370 | 400 |
| (xi) $Na_2S_2O_4$ (g) | 1.7 | 1.7 | 1.5 | 1.6 | 1.4 | 1.4 | 1.5 |
| (xii) Water (L) | 6.6 | 6.6 | 6 | 6.5 | 5.4 | 5.4 | 5.9 |
| (xiii) BPA (g) | 835 | 835 | 766 | 824 | 686 | 686 | 755 |
| (xiv) MC (L) | 17 | 17 | 20 | 0 | 6 | 6 | 3 |
| PDMS content (wt %) | 20 | 29 | 40 | 20 | 30 | 40 | 21 |
| Mv | 17,300 | 18,200 | 18,300 | 17,700 | 17,300 | 17,100 | 17,900 |

|  | Production Examples | | | | |
|---|---|---|---|---|---|
|  | 8 | 9 | 10 | 11 | 12 |
| PC-POS (A) | A8 | A9 | A10 | A11 | A12 |
| (i) PCO (L) | 11 | 15 | 12 | 15 | 12 |
| (ii) MC (L) | 23.9 | 8.3 | 27.6 | 9.6 | 27.3 |
| (iii) PDMS chain length (n) | 91 | 39 | 61 | 91 | 91 |
| (iv) PDMS loading amount (g) | 1,800 | 750 | 500 | 370 | 520 |
| (v) MC (L) | 2 | 1.5 | 1 | 0.5 | 1 |
| (vi) TEA (mL) | 6.1 | 8.4 | 6.6 | 8.3 | 6.6 |
| (vii) NaOHaq (g) | 762 | 1,085 | 867 | 1,084 | 867 |
| (viii) PTBP (g) | 52.8 | 77.7 | 55.1 | 72 | 57.6 |
| (ix) MC (L) | 0.3 | 0.5 | 0.5 | 0.3 | 0.3 |
| (x) NaOH (g) | 400 | 562 | 444 | 546 | 437 |
| (xi) $Na_2S_2O_4$ (g) | 1.5 | 2.1 | 1.6 | 2.1 | 1.6 |
| (xii) Water (L) | 5.9 | 8.2 | 6.5 | 8 | 6.4 |
| (xiii) BPA (g) | 755 | 1,044 | 824 | 1,029 | 824 |
| (xiv) MC (L) | 3 | 10 | 0 | 14 | 0 |
| PDMS content (wt %) | 33 | 12 | 10 | 6 | 13 |
| Mv | 18,100 | 17,900 | 17,700 | 17,600 | 17,300 |

TABLE 1-2

|  | Production Examples | | | | |
|---|---|---|---|---|---|
|  | 13 | 14 | 15 | 16 | 17 |
| PC-POS (A) | A13 | A14 | A15 | A16 | A17 |
| (i) PCO (L) | 6.0 | 6.0 | 8.0 | 11 | 8.0 |
| (ii) MC (L) | 12.5 | 12.5 | 16.5 | 23.9 | 16.5 |
| (iii) PDMS chain length (n) | 61 | 61 | 91 | 91 | 91 |
| (iv) PDMS loading amount (g) | 970 | 970 | 1,050 | 1,400 | 1,050 |
| (v) MC (L) | 2 | 2 | 2 | 2 | 2 |
| (vi) TEA (mL) | 3.4 | 3.4 | 4.4 | 6.1 | 4.4 |
| (vii) NaOHaq (g) | 761 | 761 | 545 | 762 | 545 |
| (viii) PTBP (g) | 40.4 | 15.6 | 64.2 | 52.8 | 21.8 |
| (ix) MC (L) | 500 | 500 | 500 | 300 | 500 |
| (x) NaOH (g) | 225 | 225 | 291 | 400 | 291 |
| (xi) $Na_2S_2O_4$ (g) | 0.7 | 0.8 | 1.1 | 1.5 | 1.1 |
| (xii) Water (L) | 3.3 | 3.3 | 4.3 | 5.9 | 4.3 |
| (xiii) BPA (g) | 350 | 378 | 549 | 755 | 549 |
| (xiv) MC (L) | 5 | 10 | 5 | 0 | 10 |
| PDMS content (wt %) | 29 | 29 | 25 | 25 | 25 |
| Mv | 15,000 | 21,200 | 14,000 | 17,800 | 21,900 |

Examples 1 to 13 and Comparative Examples 1 to 4

Anyone of the PC-POS copolymers A1 to A17 obtained in Production Examples 1 to 17, and other respective components were mixed at blending ratios shown in Table 2-1 to Table 2-3, and the mixture was supplied to a vented twin-screw extruder (manufactured by Toshiba Machine Co., Ltd., TEM-35B) and melt-kneaded at a screw revolution number of 150 rpm, an ejection amount of 20 kg/hr, and a resin temperature of from 295° C. to 300° C. to provide an evaluation pellet sample. The measurement of a PDMS content, an Mv, a MFR, a Q value, and impact resistance, and image observation and image analysis with a SPM were performed by using the evaluation pellet sample. Typical images (the images each correspond to a 1-micrometer square) of the results of the observation of the polycarbonate resin compositions obtained in Examples 1 to 8 and Comparative Example 4 with the SPM are shown in FIGS. 1 to 9.

TABLE 2-1

|  |  |  | Example 1 | Example 2 | Example 3 | Example 4 | Example 5 | Example 6 | Example 7 | Example 8 |
|---|---|---|---|---|---|---|---|---|---|---|
| Blended component (parts by mass) | PC-POS (A) | A1 | 16 |  |  |  |  |  |  |  |
|  |  | A2 |  | 11 |  |  |  |  |  |  |
|  |  | A3 |  |  | 8 |  |  |  |  |  |
|  |  | A4 |  |  |  | 12 |  |  |  |  |
|  |  | A5 |  |  |  |  | 8 |  |  |  |
|  |  | A6 |  |  |  |  |  | 6 |  |  |
|  |  | A7 |  |  |  |  |  |  | 11 |  |
|  |  | A8 |  |  |  |  |  |  |  | 7 |
|  | Polycarbonate-based resin (B)* |  | 84 | 89 | 92 | 88 | 92 | 94 | 89 | 93 |
|  | Antioxidant** |  | 0.05 | 0.05 | 0.05 | 0.05 | 0.05 | 0.05 | 0.05 | 0.05 |
|  | PDMS chain length (n) |  | 39 | 39 | 39 | 61 | 61 | 61 | 91 | 91 |
|  | PDMS content (wt %) |  | 3.2 | 3.2 | 3.2 | 2.4 | 2.4 | 2.4 | 2.4 | 2.4 |
| Evaluation result | Presence/absence of domain (d) |  | Present | Present | Present | Present | Present | Present | Present | Present |
|  | Was it confirmed that number of (d-2) inside (d-1) was two or more? y: confirmed n: not confirmed |  | y | y | y | n | y | y | n | y |
|  | Ratio (%) of number of (d) to total number of (d) and (d') |  | 22.0 | 41.4 | 41.1 | 11.3 | 28.0 | 43.8 | 4.2 | 18.7 |
|  | Average cross-section area ($nm^2$) of total of (d) and (d') |  | 1,313 | 3,682 | 17,429 | 964 | 2,449 | 3,096 | 244 | 1,013 |
|  | Mean inter-particle distance (nm) |  | 75 | 175 | 314 | 101 | 155 | 164 | 59 | 95 |
|  | Mv |  | 17,700 | 17,700 | 17,700 | 17,700 | 17,700 | 17,600 | 17,600 | 17,400 |
|  | MFR (g/10 min) |  | 20 | 20 | 21 | 19 | 20 | 21 | 23 | 23 |
|  | Q value ($\times 10^{-2}$ mL/sec) |  | 14 | 13 | 14 | 12 | 13 | 13 | 13 | 14 |
|  | Notched Izod impact strength ($kJ/m^2$) at −40° C. |  | 58 | 49 | 55 | 36 | 54 | 52 | 52 | 57 |
|  | Notched Izod impact strength ($kJ/m^2$) at 23° C. |  | no data | no data | no data | no data | no data | no data | 75 | 72 |

*Polycarbonate-based resin: [manufactured by Idemitsu Kosan Co., Ltd., TARFLON FN1700 (product name), viscosity-average molecular weight = 17,700]

**Antioxidant: "IRGAFOS 168 (product name)" [tris(2,4-di-t-butylphenyl) phosphite, manufactured by BASF Japan]

TABLE 2-2

| | | | Examples | | | | |
|---|---|---|---|---|---|---|---|
| | | | 9 | 10 | 11 | 12 | 13 |
| Blended component (parts by mass) | PC-POS (A) | A13 | 8.3 | | | | |
| | | A14 | | 8.3 | | | |
| | | A15 | | | 9.6 | | |
| | | A16 | | | | 9.6 | |
| | | A17 | | | | | 9.6 |
| | Polycarbonate-based resin (B-1)* | | | 11.0 | | 2.7 | 14.4 |
| | Polycarbonate-based resin (B-2)* | | 87.1 | 80.7 | 83.2 | 87.7 | 76.0 |
| | Polycarbonate-based resin (B-3)* | | 4.6 | | 7.2 | | |
| | Antioxidant** | | 0.05 | 0.05 | 0.05 | 0.05 | 0.05 |
| | PDMS chain length (n) | | 61 | 61 | 91 | 91 | 91 |
| | PDMS concentration (wt %) (y') | | 2.4 | 2.4 | 2.4 | 2.4 | 2.4 |
| Evaluation result | Presence/absence of domain (d) | | Present | Present | Present | Present | Present |
| | Was it confirmed that number of (d-2) inside (d-1) was two or more? y: confirmed n: not confirmed | | y | y | y | n | n |
| | Ratio (%) of number of (d) to total number of (d) and (d') | | 63.0 | 73.5 | 44.9 | 27.5 | 18.1 |
| | Average cross-section area(nm$^2$) of total of (d) and (d') | | 1,626 | 841 | 568 | 721 | 462 |
| | Mean inter-particle distance (nm) | | 110 | 81 | 63 | 91 | 65 |
| | Mv | | 17,600 | 17,400 | 17,700 | 17,600 | 17,500 |
| | MFR (g/10 min) | | 21 | 21 | 21 | 21 | 21 |
| | Q value (×10$^{-2}$ mL/sec) | | 13 | 13 | 13 | 13 | 13 |
| | Notched Izod impact strength (kJ/m$^2$) at −40° C. | | 37 | 62 | 54 | 60 | 57 |
| | Notched Izod impact strength (kJ/m$^2$) at 23° C. | | no data | no data | no data | no data | no data |

*Polycarbonate-based resin:
B-1: [manufactured by Idemitsu Kosan Co., Ltd., TARFLON FN1500 (product name), viscosity-average molecular weight = 14,200]
B-2: [manufactured by Idemitsu Kosan Co., Ltd., TARFLON FN1700 (product name), viscosity-average molecular weight = 17,700]
B-3: [manufactured by Idemitsu Kosan Co., Ltd., TARFLON FN2200 (product name), viscosity-average molecular weight = 21,300]
**Antioxidant: "IRGAFOS 168 (product name)" [tris(2,4-di-t-butylphenyl) phosphite, manufactured by BASF Japan]

TABLE 2-3

| | | | Comparative Examples | | | |
|---|---|---|---|---|---|---|
| | | | 1 | 2 | 3 | 4 |
| Blended component (parts by mass) | PC-POS (A) | A9 | 27 | | | |
| | | A10 | | 24 | | |
| | | A11 | | | 40 | |
| | | A12 | | | | 18 |
| | Polycarbonate-based resin (B)* | | 73 | 76 | 60 | 82 |
| | Antioxidant** | | 500 | 500 | 500 | 500 |
| | PDMS chain length (n) | | 39 | 61 | 91 | 91 |
| | PDMS content (wt %) | | 3.2 | 2.4 | 2.4 | 2.4 |
| Evaluation result | Presence/absence of domain (d) | | Absent | Absent | Absent | Absent |
| | Ratio (%) of number of (d) to total number of (d) and (d') | | 0 | 0 | 0 | 0 |
| | Average cross-section area (nm$^2$) of total of (d) and (d') | | 227 | 149 | 115 | 192 |
| | Mean inter-particle distance (nm) | | 45 | 46 | 36 | 54 |
| | Mv | | 17,800 | 17,700 | 17,400 | 17,500 |
| | MFR (g/10 min) | | 17 | 19 | 21 | 22 |
| | Q value (×10$^{-2}$ mL/sec) | | 13 | 12 | 13 | 13 |
| | Notched Izod impact strength (kJ/m$^2$) at −40° C. | | 29 | 22 | 29 | 30 |
| | Notched Izod impact strength (kJ/m$^2$) at 23° C. | | no data | no data | 76 | 77 |

*Polycarbonate-based resin: [manufactured by Idemitsu Kosan Co., Ltd., TARFLON FN1700 (product name), viscosity-average molecular weight = 17,700]
**Antioxidant: "IRGAFOS 168 (product name)" [tris(2,4-di-t-butylphenyl) phosphite, manufactured by BASF Japan]

[Evaluation Test]
<Fluidity Evaluation> (MFR)

The amount (g/10 min) of a molten resin flowing out of a die having a diameter of 2 mm and a length of 8 mm was measured by using the above-mentioned pellet in conformity with JIS K 7210 at 300° C. under a load of 1.2 kg.

<Q Value (Flow Value) [Unit; 10$^{-2}$ mL/Sec]>

The amount (mL/sec) of a molten resin flowing out of a nozzle having a diameter of 1 mm and a length of 10 mm was measured by using the above-mentioned pellet and a Koka flow tester inconformity with JIS K 7210 at 280° C. under a pressure of 15.9 MPa. A Q value represents an outflow amount per unit time, and a higher numerical value therefor means that the fluidity of the resin is better.

<Impact Resistance>

The above-mentioned resultant pellet was dried at 120° C. for 8 hours. After that, the dried product was subjected to injection molding with an injection molding machine (manufactured by Nissei Plastic Industrial Co., Ltd., NEX110, screw diameter: 36 mmφ) at a cylinder temperature of 280° C. and a mold temperature of 80° C. to produce an IZOD test piece (measuring 63 mm by 13 mm by 3.2 mm). Notched Izod impact strengths at −40° C. and, in some cases, 23° C. were measured by using a test piece obtained by making a notch in the test piece through post-processing in conformity with the ASTM standard D-256.

INDUSTRIAL APPLICABILITY

The polycarbonate resin obtained in the present invention can be suitably used as a casing and the like for a part for electrical and electronic equipment, and a part and the like for an automobile and a building material because the resin is excellent in impact resistance.

The invention claimed is:

1. A polycarbonate-based resin composition, comprising:
a polycarbonate-polyorganosiloxane copolymer (A) containing a polycarbonate block (A-1) comprising a repeating unit represented by the following general formula (I) and a polyorganosiloxane block (A-2) comprising a repeating unit represented by the following general formula (II); and
an aromatic polycarbonate-based resin (B) except the polycarbonate-polyorganosiloxane copolymer (A),
wherein the polycarbonate-based resin composition has a structure in which a domain (d-1) containing the polyorganosiloxane block (A-2) is present in a matrix containing the aromatic polycarbonate-based resin (B) as a main component, and a domain (d-2) containing at least one selected from a block derived from the aromatic polycarbonate-based resin (B) and the polycarbonate block (A-1) is present inside the domain (d-1):

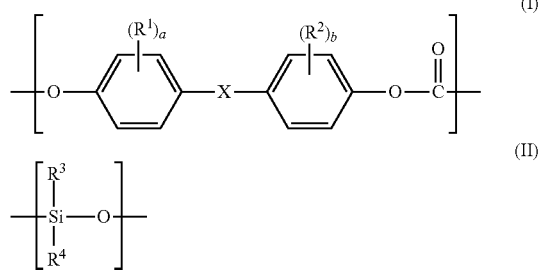

wherein $R^1$ and $R^2$ each independently represent a halogen atom, an alkyl group having 1 to 6 carbon atoms, or an alkoxy group having 1 to 6 carbon atoms, X represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, a fluorenediyl group, an arylalkylene group having 7 to 15 carbon atoms, an arylalkylidene group having 7 to 15 carbon atoms, —S—, —SO—, —SO$_2$—, —O—, or —CO—, $R^3$ and $R^4$ each independently represent a hydrogen atom, a halogen atom, an alkyl group having 1 to 6 carbon atoms, an alkoxy group having 1 to 6 carbon atoms, or an aryl group having 6 to 12 carbon atoms, and a and b each independently represent an integer of from 0 to 4.

2. The polycarbonate-based resin composition according to claim 1, wherein a mass ratio "(A)/(B)" of the polycarbonate-polyorganosiloxane copolymer (A) to the aromatic polycarbonate-based resin (B) is from 0.1/99.9 to 99.9/0.1.

3. The polycarbonate-based resin composition according to claim 1, wherein the aromatic polycarbonate-based resin (B) contains a polycarbonate block comprising, in a main chain thereof, a repeating unit represented by the following general formula (III):

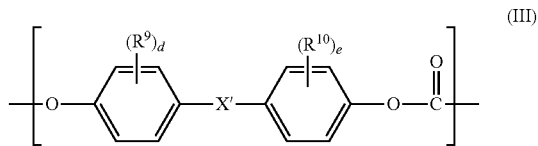

wherein $R^9$ and $R^{10}$ each independently represent a halogen atom, an alkyl group having 1 to 6 carbon atoms, or an alkoxy group having 1 to 6 carbon atoms, X' represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, —S—, —SO—, —SO$_2$—, —O—, or —CO—, and d and e each independently represent an integer of from 0 to 4.

4. The polycarbonate-based resin composition according to claim 1, wherein the domain (d-1) is mainly formed of the polyorganosiloxane block (A-2).

5. The polycarbonate-based resin composition according to claim 1, wherein the domain (d-2) is mainly formed of at least one selected from the block derived from the aromatic polycarbonate-based resin (B) and the polycarbonate block (A-1).

6. The polycarbonate-based resin composition according to claim 1, wherein only the one domain (d-2) is present inside the domain (d-1).

7. The polycarbonate-based resin composition according to claim 1, wherein the two or more domains (d-2) are present inside the domain (d-1).

8. The polycarbonate-based resin composition according to claim 1, wherein a ratio of a number of domains (d) in each of which the domain (d-2) is present inside the domain (d-1) to a total number of the domains (d) and domains (d') each formed only of the domain (d-1) is from 2% to 100%.

9. The polycarbonate-based resin composition according to claim 8, wherein an average cross-section area of all domains corresponding to a total of the domains (d) and the domains (d') is 200 nm$^2$ or more.

10. The polycarbonate-based resin composition according to claim 8, wherein an average cross-section area of all domains corresponding to a total of the domains (d) and the domains (d') is 20,000 nm$^2$ or less.

11. The polycarbonate-based resin composition according to claim 8, wherein a mean inter-particle distance of all domains corresponding to a total of the domains (d) and the domains (d') is 500 nm or less.

12. The polycarbonate-based resin composition according to claim 8, wherein a mean inter-particle distance of all domains corresponding to a total of the domains (d) and the domains (d') is 50 nm or more.

13. The polycarbonate-based resin composition according to claim 1, wherein the polyorganosiloxane block (A-2) has an average chain length of from 30 to 500.

14. The polycarbonate-based resin composition according to claim 1, wherein the polyorganosiloxane block (A-2) has an average chain length of from 55 to 500.

15. The polycarbonate-based resin composition according to claim 1, wherein a content of the polyorganosiloxane block (A-2) in the polycarbonate-polyorganosiloxane copolymer (A) is from 5 mass % to 70 mass %.

16. The polycarbonate-based resin composition according to claim 1, wherein a content of the polyorganosiloxane block (A-2) in the polycarbonate-based resin composition is from 0.1 mass % to 10 mass %.

17. The polycarbonate-based resin composition according to claim 1, wherein the polycarbonate-polyorganosiloxane copolymer (A) has a viscosity-average molecular weight (Mv) of from 9,000 to 50,000.

18. The polycarbonate-based resin composition according to claim 1, wherein the polycarbonate-based resin composition has a viscosity-average molecular weight (Mv) of from 9,000 to 50,000.

19. A molded article, which is obtained by molding the polycarbonate-based resin composition of claim 1.

20. The molded article according to claim 19, wherein the molded article comprises a casing for electrical and electronic equipment.

21. The molded article according to claim 19, wherein the molded article comprises a part for an automobile and a building material.

* * * * *